(12) United States Patent
Ibrahim et al.

(10) Patent No.: US 12,445,215 B2
(45) Date of Patent: Oct. 14, 2025

(54) REFERENCE SIGNAL CONFIGURATION FOR MEASURING CROSS-LINK INTERFERENCE IN A FULL DUPLEX ENVIRONMENT

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Ahmed Attia Abotabl, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/520,217

(22) Filed: Nov. 5, 2021

(65) Prior Publication Data
US 2023/0147157 A1 May 11, 2023

(51) Int. Cl.
*H04B 17/345* (2015.01)
*H04L 5/00* (2006.01)
*H04L 5/14* (2006.01)

(52) U.S. Cl.
CPC ......... *H04B 17/345* (2015.01); *H04L 5/0048* (2013.01); *H04L 5/0073* (2013.01); *H04L 5/14* (2013.01)

(58) Field of Classification Search
CPC . H04W 24/10; H04W 72/541; H04W 72/542; H04B 17/345; H04B 17/318; H04B 17/327; H04L 5/0044; H04L 5/0048; H04L 5/0073; H04L 5/14; H04L 25/0226; H04J 11/0023; H04J 11/005
See application file for complete search history.

(56) References Cited

U.S. PATENT DOCUMENTS

| | | | | |
|---|---|---|---|---|
| 2018/0007724 | A1* | 1/2018 | Kazmi | H04W 8/005 |
| 2018/0323916 | A1* | 11/2018 | Yang | H04L 5/0053 |
| 2020/0213052 | A1* | 7/2020 | Li | H04W 72/23 |
| 2020/0228213 | A1* | 7/2020 | Masal | H04L 5/14 |
| 2022/0116129 | A1* | 4/2022 | Ying | H04B 17/345 |

(Continued)

FOREIGN PATENT DOCUMENTS

CN 111988099 A * 11/2020

OTHER PUBLICATIONS

International Search Report and Written Opinion—PCT/US2022/078330—ISA/EPO—Feb. 9, 2023.

(Continued)

*Primary Examiner* — Quoc Thai N Vu
(74) *Attorney, Agent, or Firm* — Patterson + Sheridan, L.L.P.

(57) ABSTRACT

Techniques and apparatus for configuring a reference signal for measuring cross-link interference in wireless communication systems. A method that may be performed by a user equipment (UE) includes receiving signaling indicating a configuration for a reference signal for measuring cross-link interference and indicating a type of the reference signal as zero-power or non-zero-power; and taking one or more actions in response to the type of the reference signal.

30 Claims, 15 Drawing Sheets

(56) References Cited

U.S. PATENT DOCUMENTS

2022/0159580 A1* 5/2022 Su .............................. H04L 5/14
2024/0292256 A1* 8/2024 Chi ....................... H04L 1/0026

OTHER PUBLICATIONS

ZTE et al., "Discussion on Measurement and RS Design for CLI Mitigation", 3GPP TSG RAN WG1 AH_NR#1 Meeting, R1-1700271, 3rd Generation Partnership Project, Mobile Competence Centre, 650, Route Des Lucioles, F-06921 Sophia-Antipolis Cedex, vol. RAN WG1, No. Spokane, Wa, Jan. 16, 2017-Jan. 20, 2017 Jan. 16, 2017, XP051207809, pp. 1-8, Section 3, Sections 3.2-3.3, paragraphs [04.2], [04.3].

* cited by examiner

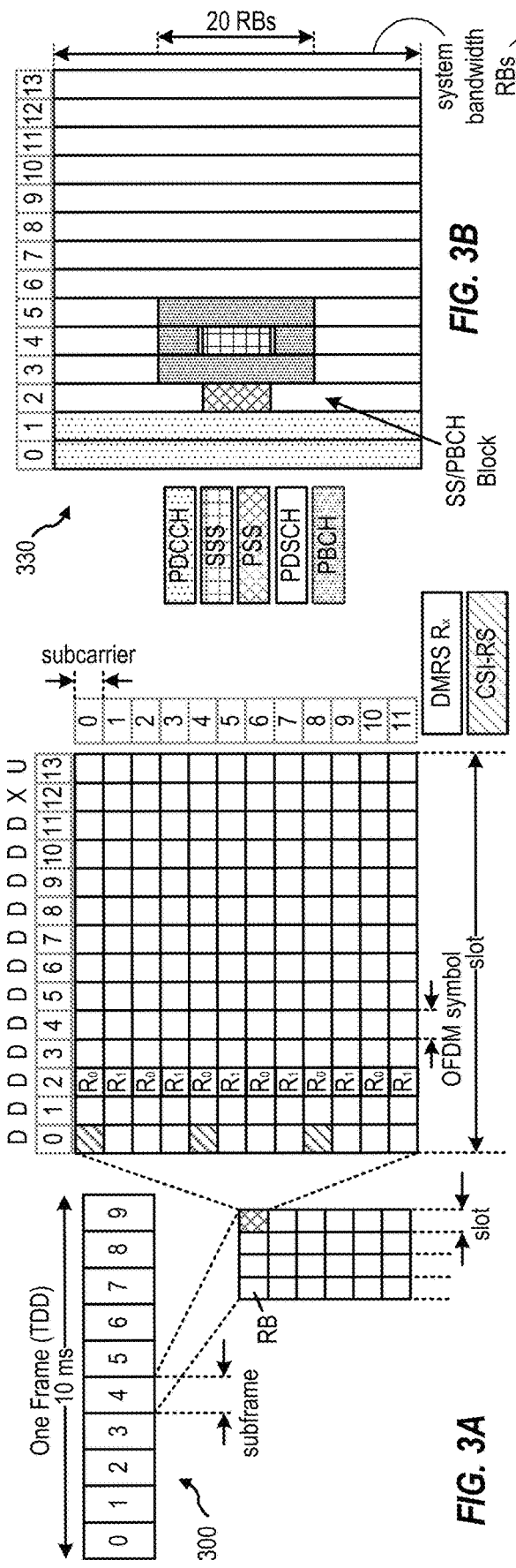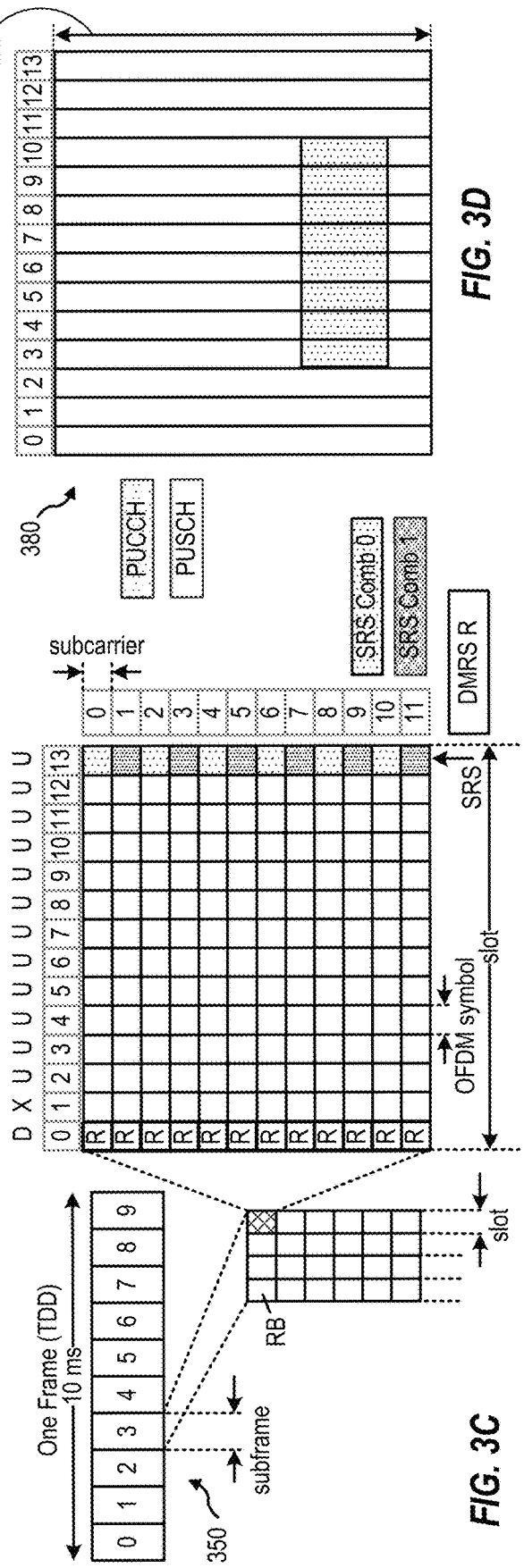

REFERENCE SIGNAL CONFIGURATION FOR MEASURING CROSS-LINK INTERFERENCE IN A FULL DUPLEX ENVIRONMENT

BACKGROUND

Aspects of the present disclosure relate to wireless communications, and more particularly, to techniques and apparatus for configuring a reference signal for measuring cross-link interference in wireless communication systems.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include spectral efficiencies in configuring resources for cross-link interference measurements.

Certain aspects of the subject matter described in this disclosure can be implemented in a method for wireless communication by a user equipment (UE). The method generally includes receiving signaling indicating a configuration for a reference signal for measuring cross-link interference and indicating a type of the reference signal as zero-power or non-zero-power; and taking one or more actions in response to the type of the reference signal.

Certain aspects of the subject matter described in this disclosure can be implemented in a method for wireless communication by a network entity. The method generally includes transmitting, to a first UE, first signaling indicating a configuration for a reference signal for measuring cross-link interference and indicating that the reference signal is non-zero-power; transmitting, to a second UE, second signaling indicating the configuration and that the reference signal is zero-power; and receiving a report on the cross-link interference from the second UE.

Certain aspects of the subject matter described in this disclosure can be implemented in an apparatus for wireless communication. The apparatus generally includes a memory and a processor coupled to the memory. The processor and the memory are configured to receive signaling indicating a configuration for a reference signal for measuring cross-link interference and indicating a type of the reference signal as zero-power or non-zero-power; and take one or more actions in response to the type of the reference signal.

Certain aspects of the subject matter described in this disclosure can be implemented in an apparatus for wireless communication. The apparatus generally includes a memory and a processor coupled to the memory. The processor and the memory being configured to transmit, to a first UE, first signaling indicating a configuration for a reference signal for measuring cross-link interference and indicating that the reference signal is non-zero-power; transmit, to a second UE, second signaling indicating the configuration and that the reference signal is zero-power; and receive a report on the cross-link interference from the second UE.

Certain aspects of the subject matter described in this disclosure can be implemented in an apparatus for wireless communication. The apparatus generally includes means for receiving signaling indicating a configuration for a reference signal for measuring cross-link interference and indicating a type of the reference signal as zero-power or non-zero-power; and means for taking one or more actions in response to the type of the reference signal.

Certain aspects of the subject matter described in this disclosure can be implemented in an apparatus for wireless communication. The apparatus generally includes means for transmitting, to a first UE, first signaling indicating a configuration for a reference signal for measuring cross-link interference and indicating that the reference signal is non-zero-power; means for transmitting, to a second UE, second signaling indicating the configuration and that the reference signal is zero-power; and means for receiving a report on the cross-link interference from the second UE.

Certain aspects of the subject matter described in this disclosure can be implemented in a computer-readable medium. The computer-readable medium has instructions stored thereon for receiving signaling indicating a configuration for a reference signal for measuring cross-link interference and indicating a type of the reference signal as zero-power or non-zero-power; and taking one or more actions in response to the type of the reference signal.

Certain aspects of the subject matter described in this disclosure can be implemented in a computer-readable medium. The computer-readable medium has instructions stored thereon for transmitting, to a first UE, first signaling indicating a configuration for a reference signal for measuring cross-link interference and indicating that the reference signal is non-zero-power; transmitting, to a second UE, second signaling indicating the configuration and that the reference signal is zero-power; and receiving a report on the cross-link interference from the second UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatuses, methods, processing systems, and computer-readable mediums for configuring a reference signal for measuring cross-link interference in wireless communication systems.

In certain cases, a user equipment (UE) may be configured with resources for cross-link interference measurements on a per-UE basis, such that the transmitting UE is configured with separate control signaling than the receiving UE. For example, the transmitting UE may be configured with a sounding reference signal configuration, and the receiving UE may be configured with a periodic measurement resource and measurement reporting based on layer-3 (e.g., a radio resource control protocol layer) reporting. Such a technique for configuring resources for cross-link interference measurements may increase the overhead (e.g., frequency and/or time domain resources) used for control signaling, which may in turn result in degraded communication performance, such as increased latencies and/or decreased throughput.

Aspects of the present disclosure provide techniques and apparatus for configuring resources for cross-link interference measurements for mitigating interference in full-duplex communications. Multiple UEs may be configured by the network with a one or more common configurations indicating zero-power and non-zero-power resources that can be used for reporting cross-link interference encountered at a UE. The network may indicate which UE(s) will be the transmitting and which UE(s) will be the receiving under the configuration, as further described herein. The resource configurations may be specific among certain UEs (e.g., a transmitter/receiver UE pair or a group of UEs) or specific to cell, for example. The resource configuration may enable the transmitting UE to be aligned (synchronized) with the receiving UE. In certain aspects, the resource configuration may have specific fields for configuring a resource for cross-link interference.

The cross-link interference resource and reporting configurations described herein can reduce the overhead (e.g., frequency and/or time domain resources) for control signaling associated with cross-link interference measurement and reporting. The cross-link interference report may enable the network to mitigate cross-link interference encountered at UE, for example, due to full-duplex communications as described herein.

Introduction to Wireless Communication Networks

Figure 1:
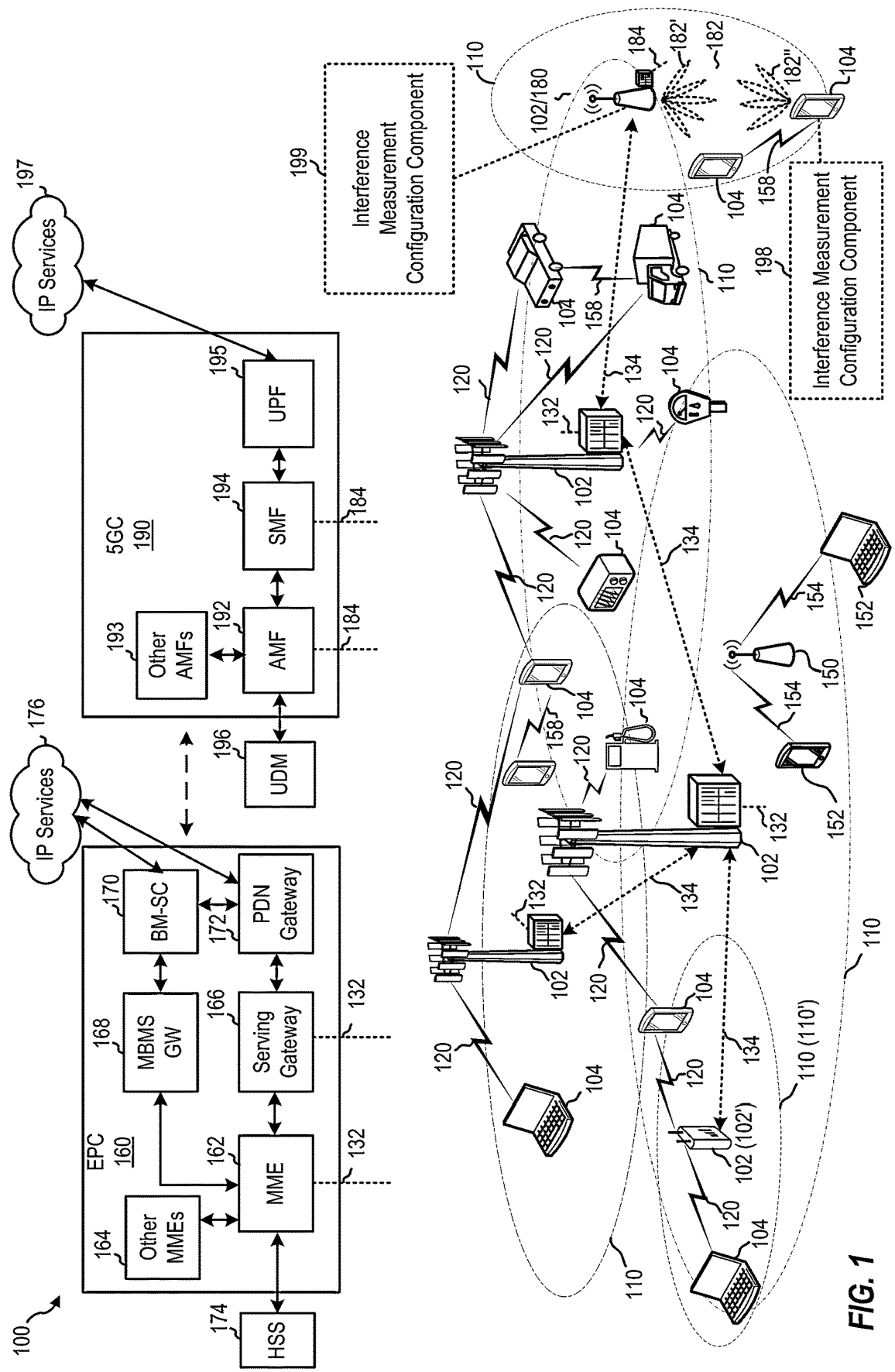
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes an interference measurement configuration component 199, which may be configured to transmit a configuration for measuring cross-link interference and receive a report on the measurement cross-link interference. Wireless network 100 further includes an interference measurement configuration component 198, which may be used configured to receive a configuration for measuring cross-link interference and determining whether a reference signal for the cross-link interference is zero-power or non-zero-power.

Figure 2:
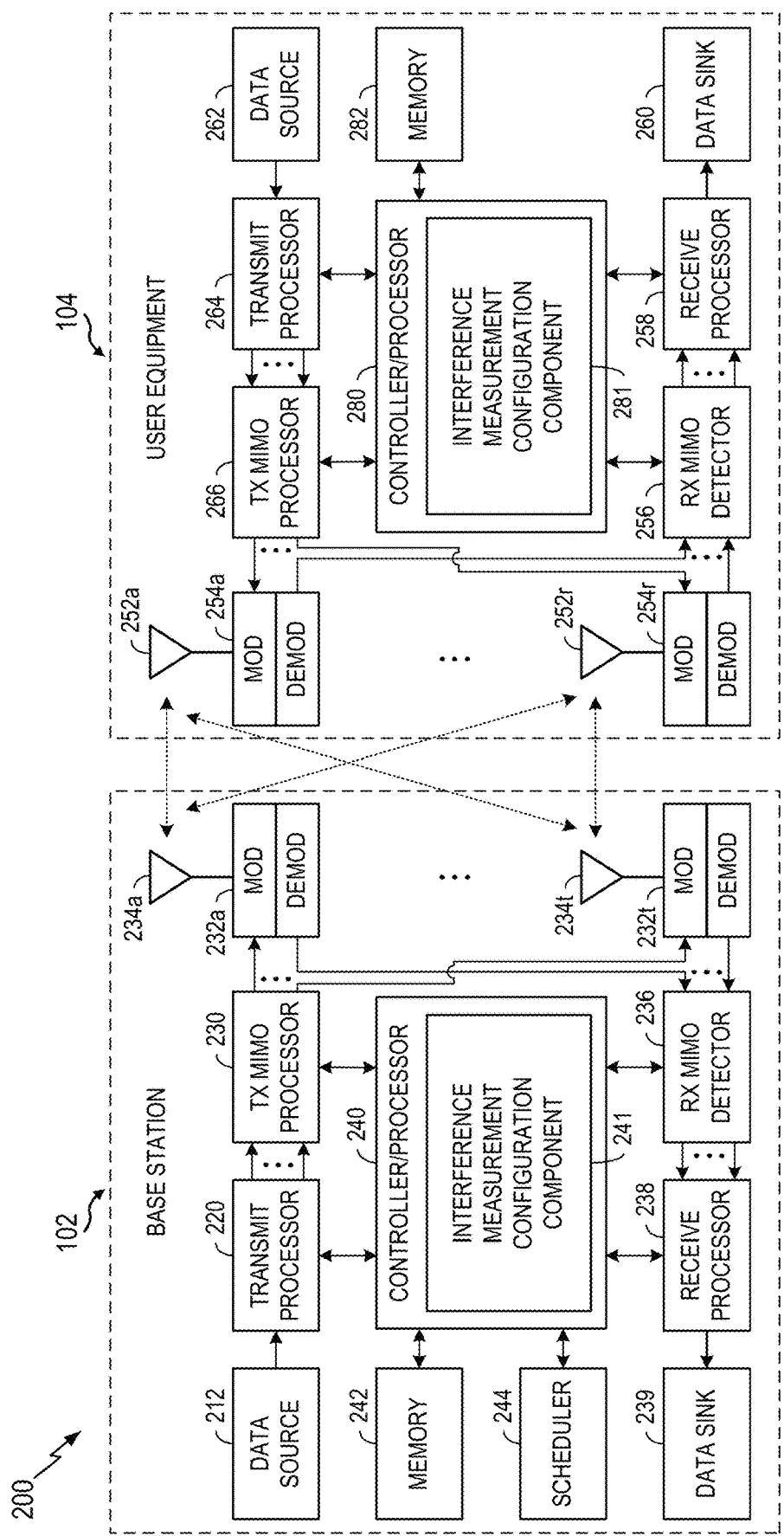
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes an interference measurement configuration component 241, which may be representative of the interference measurement configuration component 199 of FIG. 1. Notably, while depicted as an aspect of controller/processor 240, the interference measurement configuration component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes an interference measurement configuration component 281, which may be representative of the interference measurement configuration component 198 of FIG. 1. Notably, while depicted as an aspect of controller/processor 280, the interference measurement configuration component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, mmWave bands may be employed in full-duplex communications.

Example Full-Duplex Communications and Additional Considerations

In certain cases, a wireless communication system (e.g., a 5G NR system) may support full-duplex communications, where wireless communication devices may communicate with each other simultaneously (e.g., via concurrent uplink and downlink transmissions). Full-duplex communications may facilitate desirable latency at a UE, spectral efficiencies, and/or efficient resource utilization. Full-duplex communications may use beam separation (e.g., separate beams for uplink and downlink transmissions). Full-duplex communications may be employed for FR1 and/or FR2 bands, integrated access and backhaul (IAB), and/or an access link. Full-duplex may be supported at the BS and/or UE.

Full-duplex communications may introduce interference at certain wireless communication devices, and the interference may degrade the performance of wireless communications. A UE may encounter self-interference from full-duplex communications, where an uplink transmission may interfere with a downlink transmission at the UE. Full-duplex communications may also generate interference from clutter echo. The interference may cause a decoding failure at a wireless communication device, and the wireless communication device may request a retransmission, which will increase the latency and decrease the throughput of wireless communications.

Figure 4:
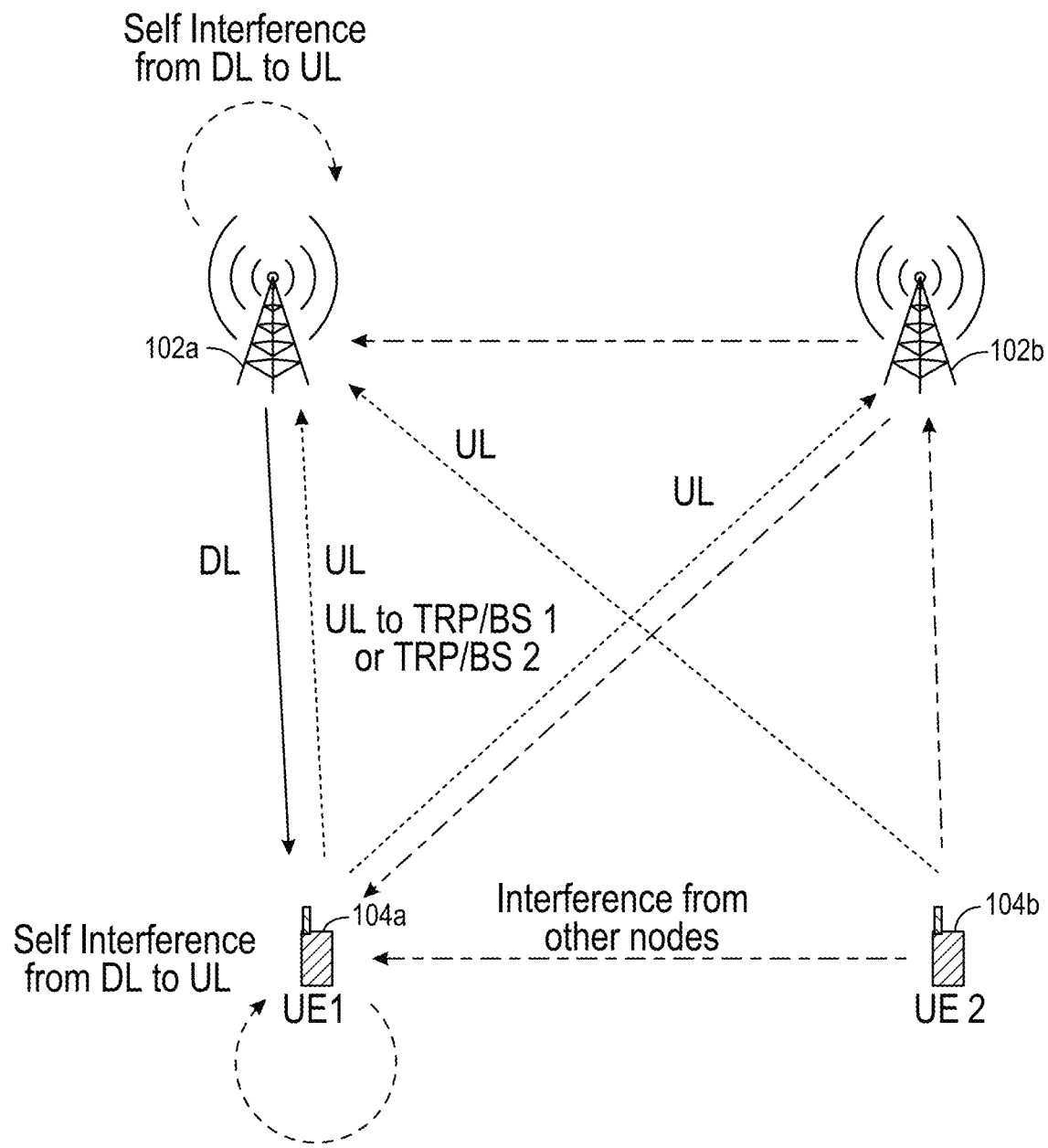
FIG. 4 is a diagram illustrating various half-duplex and full-duplex scenarios.

FIG. 4 is a diagram illustrating various half-duplex and full-duplex scenarios where interference may be encountered at a BS and/or UE. As shown, a first UE 104*a* may communicate with a first BS 102*a* in full-duplex mode. In certain cases, the first UE 104*a* may encounter interference from other wireless nodes, such as a second UE 104*b* and/or a second BS 102*b*. Interference from another cell or base station may be referred to as inter-cell interference. Interference from UEs in the same cell may be referred to as intra-cell cross-link interference, and interference from UEs in adjacent cells may be referred to as inter-cell cross-link interference. In certain cases, the first UE 104*a* may simultaneously receive downlink signaling from the first BS 102*a* and transmit uplink signaling to the second BS 102*a*. In such cases, the second BS 102*b* may encounter cross-link interference from other wireless nodes, such as the second UE 104*b*.

The cross-link interference may be due to energy leakage caused by timing and frequency misalignments between the UEs, and/or due to automatic gain control mismatch, for example, if the automatic gain control of the second UE is driven by the downlink serving cell signal, but the cross-link interference is strong enough to saturate or corrupt the automatic gain control performed at the second UE. Intra-cell cross-link interference may also occur due to cross-link interference from uplink transmissions of UEs communicating in in-band full duplex mode or cross-link interference leakage to downlink transmissions of UEs communicating in sub-band full duplex mode.

Figure 5:
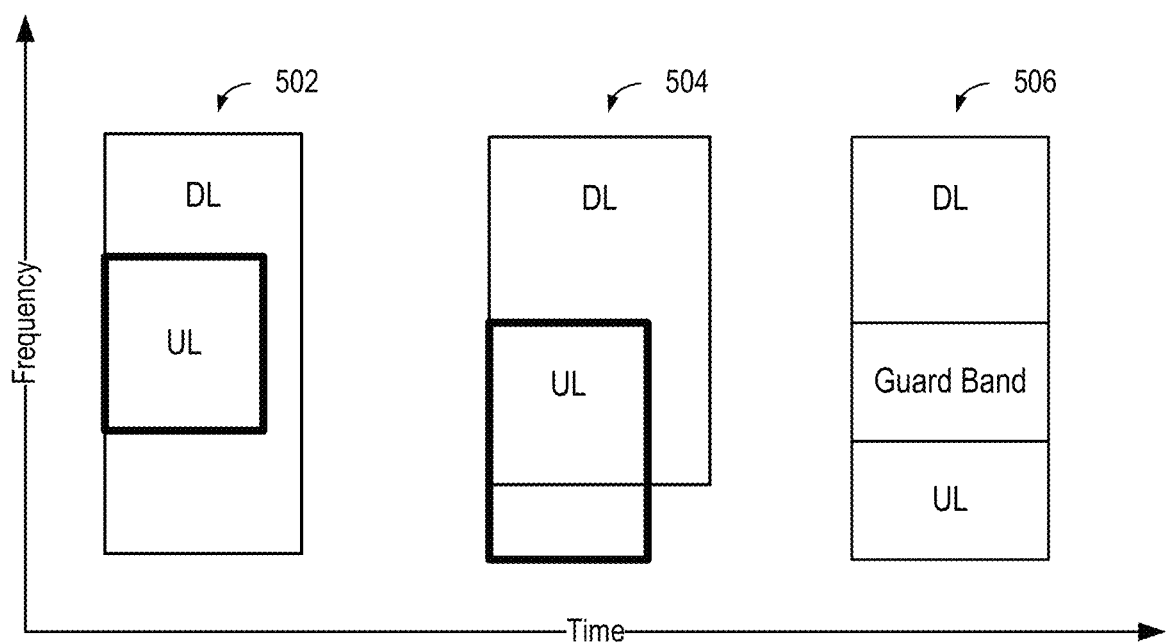
FIG. 5 illustrates examples of arrangements of frequency and time domain resources for full duplex communications.

FIG. 5 illustrates examples of arrangements of frequency and time domain resources for full duplex communications. In certain cases, uplink and downlink full duplex traffic may be arranged in overlapping time and frequency resources. The term in-band full duplex may be used to refer to full duplex with overlapping time and frequency resources. A first arrangement 502 is shown with uplink resources may fully overlap with downlink resources for full duplex communications, and a second arrangement 504 is shown with the downlink and uplink resources partially overlapping with each other.

In certain cases, uplink and downlink full duplex traffic may be arranged in separate sub-bands. The uplink and downlink full duplex traffic may be arranged in different frequency resources. The downlink resource may be separated from the uplink resource in the frequency domain. The term sub-band full duplex (or flexible duplex) may be used to refer to full duplex with separate sub-bands for uplink and downlink resources. A third arrangement 506 is depicted with uplink resources and downlink resources arranged in separate sub-bands. In certain cases, a guard band may be arranged between the uplink resources and downlink resources for full duplex communications.

In certain cases, a slot may be defined as D+U slot where a band is used for both uplink and downlink transmission. The downlink and uplink transmissions can occur in overlapping bands (in-band full-duplex) or adjacent bands (sub-band full-duplex), for example, as depicted in FIG. 5. In a given 'D+U' symbol, a half-duplex UE may transmit in an UL band or receive in a DL band. In a given 'D+U' symbol, a full-duplex UE may transmit in the uplink band and/or receive in the downlink band in the same slot. A 'D+U' slot may include downlink only symbols, uplink only symbols, or full-duplex symbols.

Figure 6:
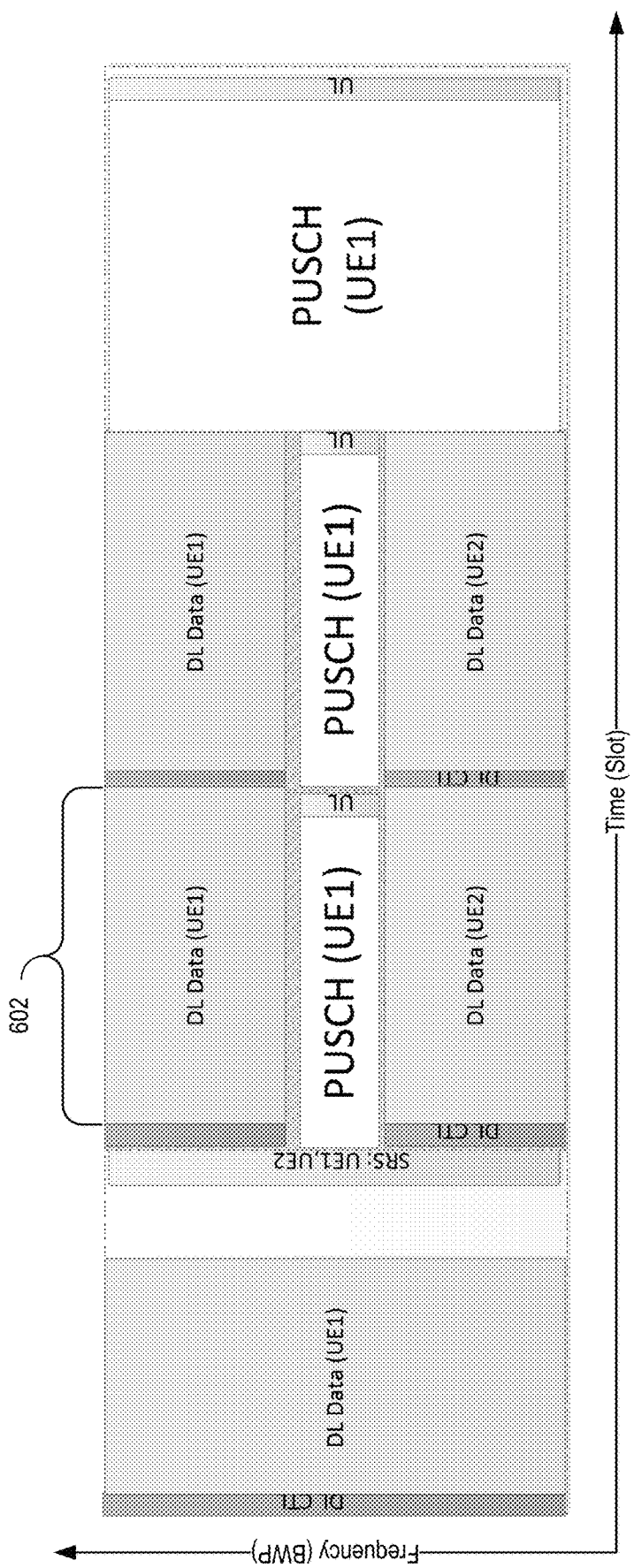
FIG. 6 depicts example slot formats for full duplex communications.

FIG. 6 depicts example slot formats for full duplex communications. In this example, downlink and uplink data transmissions for a first UE (e.g., the first UE 104*a* depicted in FIG. 4) are scheduled in adjacent bands (e.g., sub-band full duplex) in one or more symbols (or slots) 602, and downlink data transmission are scheduled in another sub-band for a second UE (e.g., the second UE 104*b* depicted in FIG. 4) in the symbols 602. In such a sub-band full duplex scenario, the uplink transmission from the first UE may cause cross-link interference at the second UE receiving downlink data in the symbols 602.

In certain cases, an uplink reference signal (e.g., a sounding reference signal (SRS)) may be used to measure the cross-link interference encountered at certain UEs, which can report the measured interference to the network. The uplink reference signal may be mapped to physical resources, for example, in a resource block. As an example with respect to an SRS, the uplink reference signal may span up to four symbols and be arranged in the last six symbols in a slot. In the frequency domain, the uplink reference signal may be arranged in a sub-carrier comb pattern, for example, with a comb offset. The uplink reference signal may be configured to be periodic, aperiodic, or semi-persistent. The uplink reference signal may be configured with a specific periodicity and slot offset. The uplink reference signal may have a certain (sounding) bandwidth in a bandwidth part (BWP). The uplink reference signal may have a frequency hopping pattern.

Figure 7:
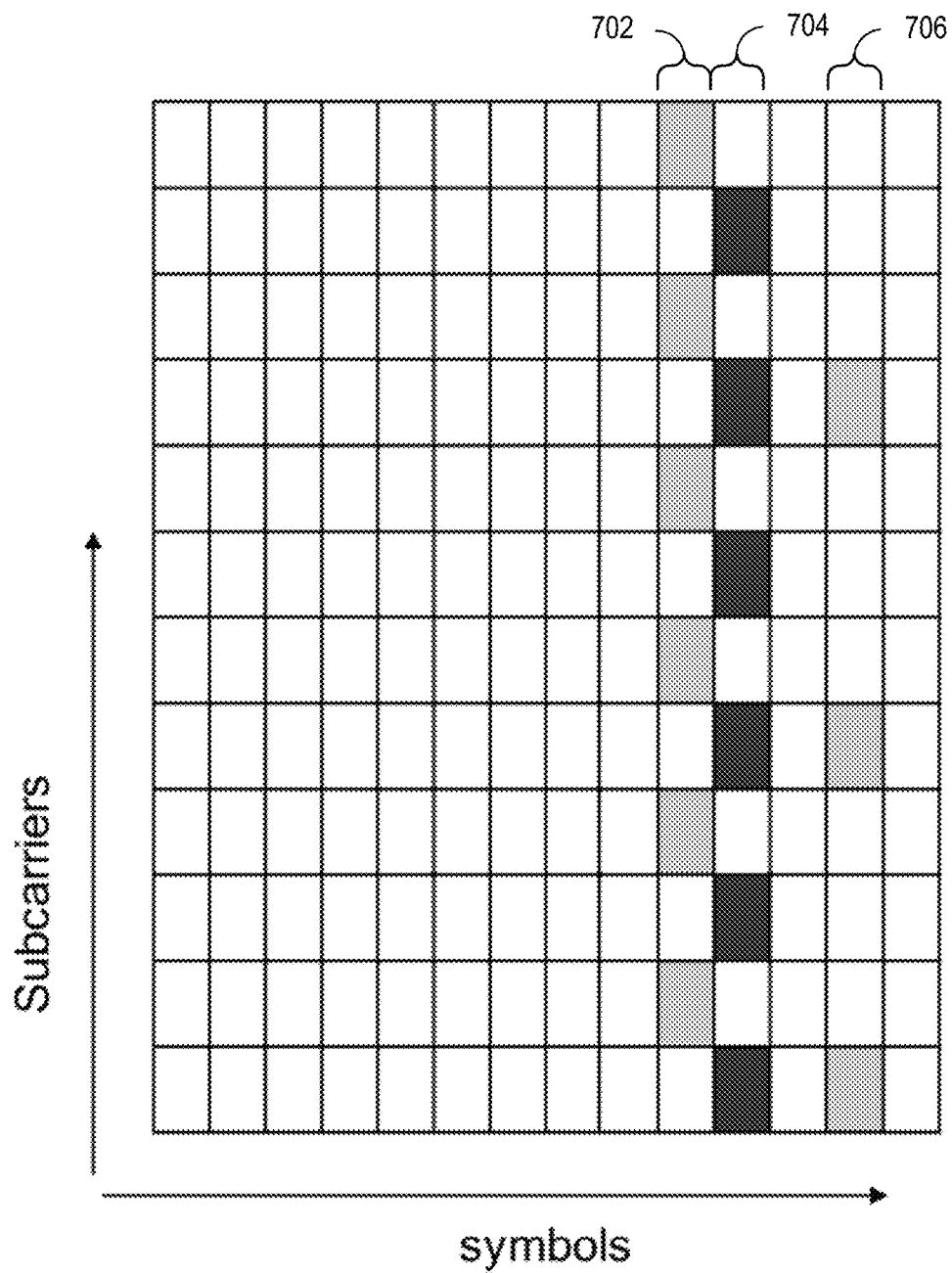
FIG. 7 illustrates an example sub-carrier comb patterns (or structures) for a reference signal.

FIG. 7 illustrates an example sub-carrier comb patterns (or structures) for a reference signal. As an example, in the tenth symbol 702, an uplink reference signal may have a comb pattern (e.g., comb-$_2$ pattern) where the uplink reference signal is arranged in every other subcarrier, for example, in every even subcarrier. In the eleventh symbol 704, the uplink reference signal may have a comb-2 pattern where the uplink reference signal is arranged in every odd subcarrier. In the thirteenth symbol 706, the uplink reference signal may have a comb pattern (e.g., comb-4) where the uplink reference signal is arranged in every fourth symbol. Other comb patterns for an SRS are described herein with respect to FIG. 3C.

Figure 8:
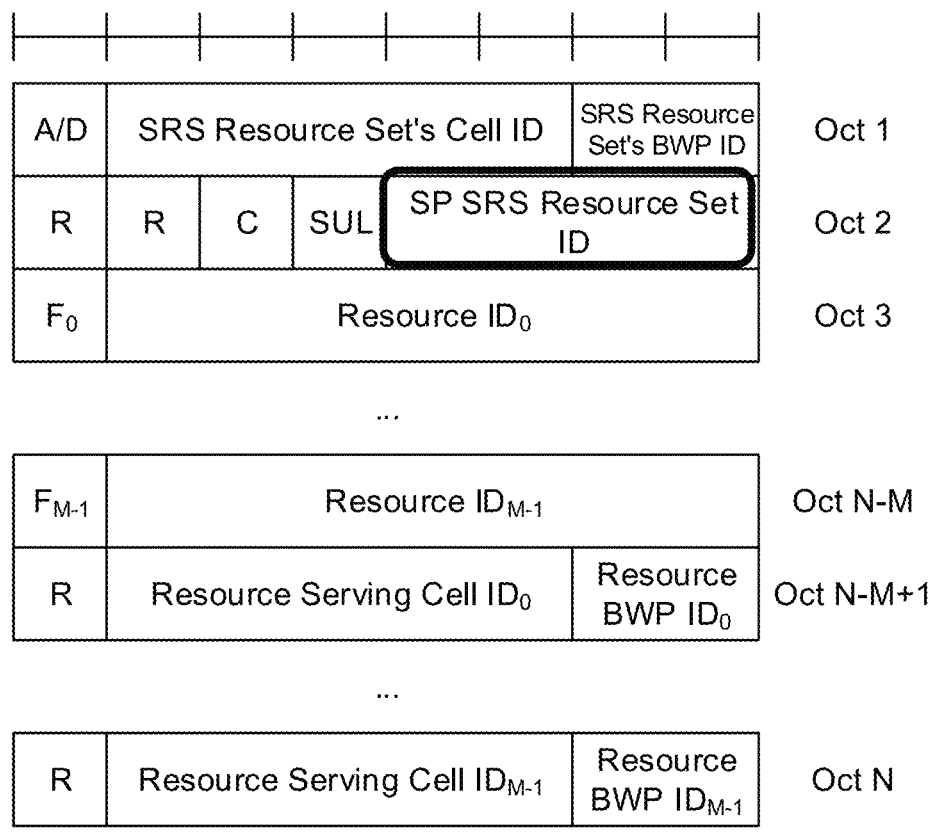
FIG. 8 illustrates an example control element (CE) for medium access control (MAC) signaling that activates or deactivates a semi-persistent reference signal.

FIG. 8 illustrates an example control element (CE) for medium access control (MAC) signaling that activates or deactivates a semi-persistent reference signal, such as an SRS. In this example, the MAC CE may have a variable size with certain fields including, for example, an activation/deactivation (A/D) field, an SRS Resource Set's Cell identity (ID) field, an SRS Resource Set's BWP ID field, a control (C) field, a supplementary uplink (SUL) carrier field, an semi-persistent (SP) SRS Resource Set ID field, $F_i$ field(s), Resource $ID_i$ field(s), Resource Serving Cell $ID_i$ field(s), Resource BWP $ID_i$ field(s), and reserved (R) bit field(s). The activation/deactivation of the semi-persistent reference signal may be on a resource set level. The SP SRS Resource Set ID field indicates the SP SRS Resource Set ID, which is to be activated or deactivated, for example, identified by SRS-ResourceSetId as specified in the 3rd Generation Partnership Project (3GPP) Technical Specification 38.331. The length of the SP SRS Resource Set ID field may be 4 bits, for example.

Figure 9:
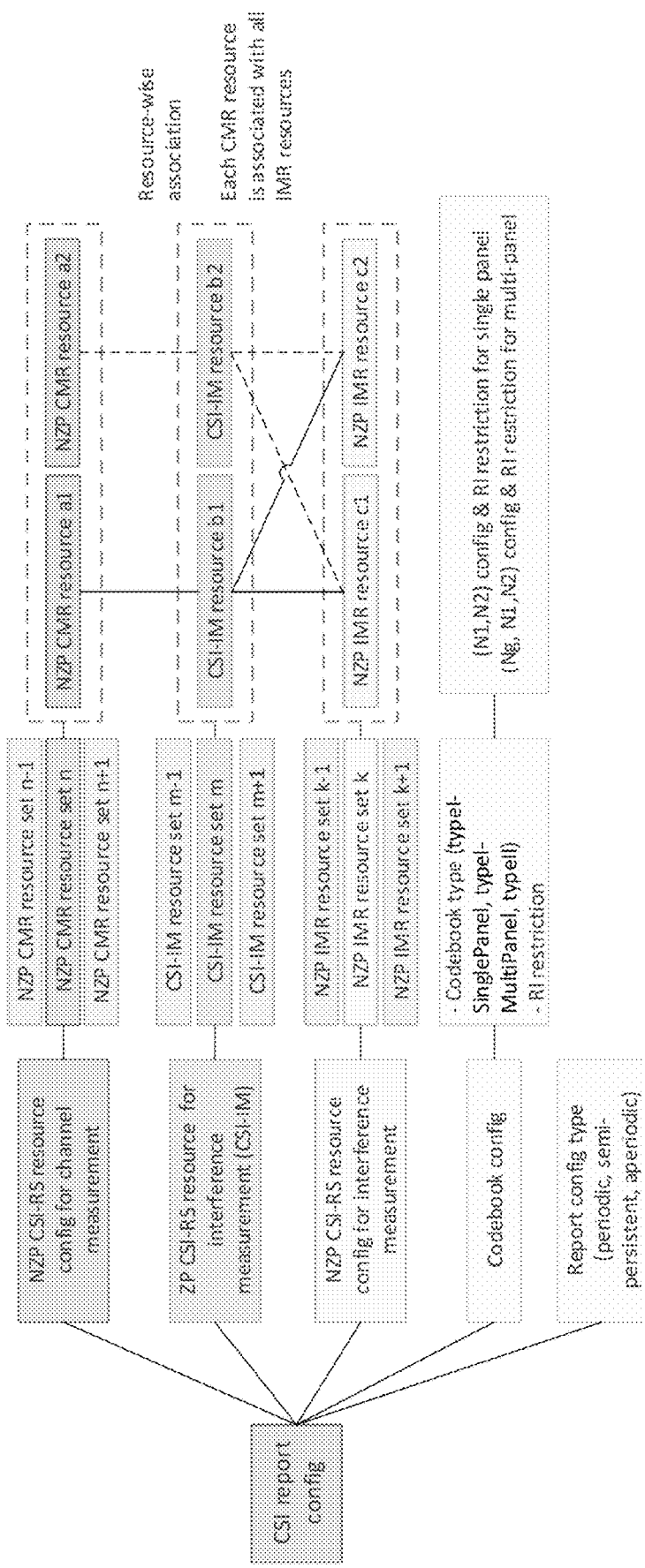
FIG. 9 illustrates a diagram of an example channel state information (CSI) report configuration.

FIG. 9 illustrates a diagram of an example channel state information (CSI) report configuration. As illustrated, the configuration may indicate, for a CSI report/resource setting, a non zero-power CSI-RS (NZP-CSI-RS) resource setting for channel measurement, zero or more (e.g., 0-2) resources for interference measurement (IM) (which may be zero-power or non-zero-power IM resources), a codebook setting for precoder feedback, and a CSI-RS report configuration type (e.g., periodic, semi-persistent, or aperiodic). If an IM resource (IMR) is configured, the IMR can be configured as either CSI-IM (zero-power) setting or NZP-CSI-RS setting. If multiple IMRs are configured, the IMRs may be configured as CSI-IM setting plus NZP CSI-RS settings. For NZP-CSI-RS IMR, any single port in the activated resources may be assumed to be an interference layer, in which case, a UE may be configured to aggregate all the interference layers in CSI calculation. As indicated in FIG. 9, there may be a resource-wise association between CMR and CSI-IM resources. In certain cases, the CSI report setting may identify or linked to only a CMR setting in case of CSI for beam management operations or only CMR and IMR settings for other types of CSI reports.

In certain cases, the UE may be configured with resources for cross-link interference measurements on a per-UE basis, such that the transmitting UE is configured with separate control signaling than the receiving UE. For example, the transmitting UE may be configured with an SRS configuration, and the receiving UE may be configured with a periodic measurement resource and measurement reporting based on layer-3 (e.g., RRC protocol layer) reporting. Moreover, due to a CSI report configuration having CMR and IMR setting combined, the CMR settings in a CSI report configuration may not be used in cases where the UE is configured to report only CLI measurements. Such techniques for configuring resources for cross-link interference measurements may increase the overhead (e.g., frequency and/or time domain resources) used for control signaling, which may in turn result in degraded communication performance, such as increased latencies and/or decreased throughput.

Accordingly, what is needed are techniques and apparatus for configuring resources for cross-link interference measurements for mitigating interference in full-duplex communications.

Aspects Related to Reference Signal Configuration for Measuring Cross-Link Interference Aspects of the present disclosure provide techniques and apparatus for configuring resources for cross-link interference measurements for mitigating interference in full-duplex communications. Multiple UEs may be configured by the network with a one or more common configurations indicating zero-power and non-zero-power resources that can be used for reporting cross-link interference encountered at a UE. The network may indicate which UE(s) will be the transmitting and which UE(s) will be the receiving under the configuration, as further described herein. The resource configurations may be specific among certain UEs (e.g., a transmitter/receiver UE pair or a group of UEs) or specific to cell, for example. The resource configuration may enable the transmitting UE to be aligned (synchronized) with the receiving UE. In certain aspects, the resource configuration may have specific fields for configuring a resource for cross-link interference.

The cross-link interference resource and reporting configurations described herein can reduce the overhead (e.g., frequency and/or time domain resources) for control signaling associated with cross-link interference measurement and reporting (such as the control signaling for configuring measurement resources, configuring reporting resources, activating semi-persistent resources, and/or triggering aperiodic resources). The cross-link interference report may enable the network to mitigate cross-link interference encountered at a UE, for example, due to full-duplex communications as described herein.

Figure 10:
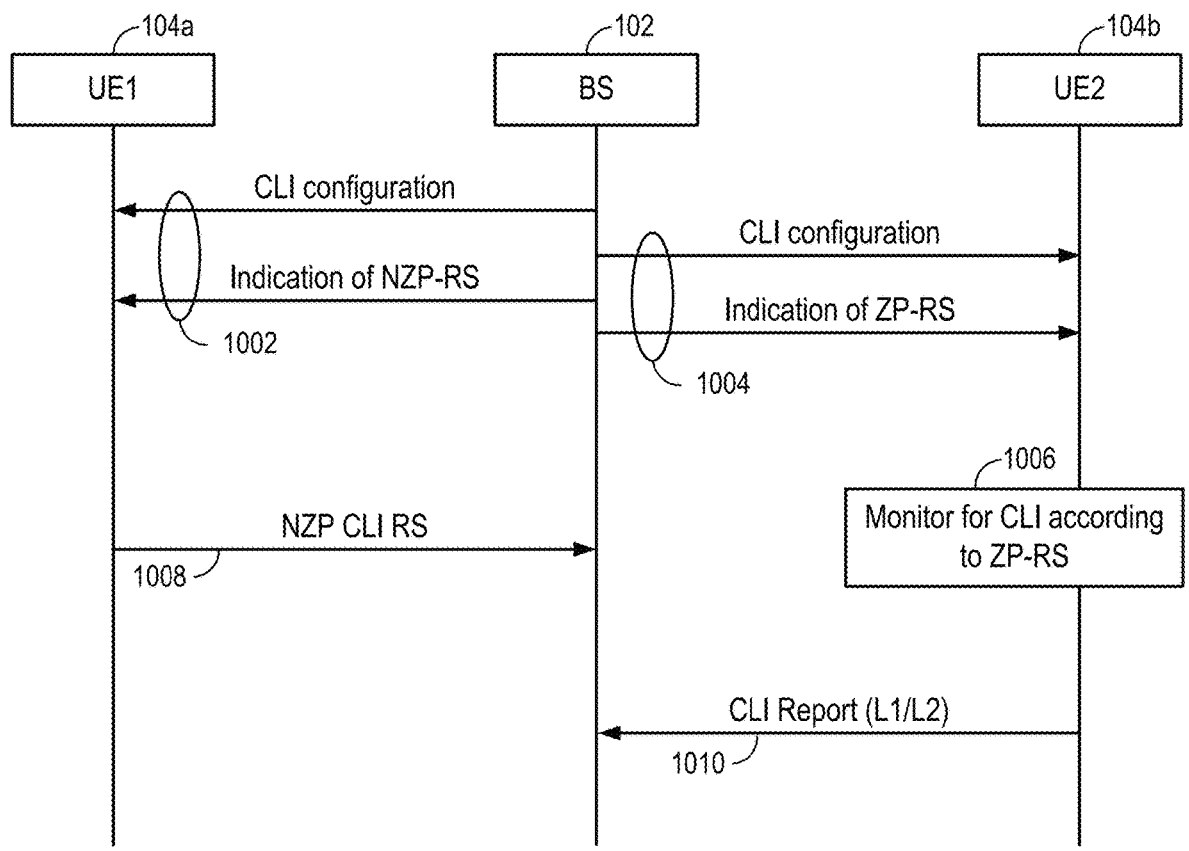
FIG. 10 is a signaling flow illustrating example signaling for configuring reference signal resources for measuring cross-link interference, in accordance with certain aspects of the present disclosure.

FIG. 10 is a signaling flow illustrating example signaling for configuring reference signal resources (e.g., time domain resources and/or frequency domain resources as depicted in FIGS. 3A-D) for measuring cross-link interference, in accordance with certain aspects of the present disclosure. At 1002, the first UE 104a may receive, from the BS 102, signaling indicating a cross-link interference (CLI) configuration that provides resources for transmitting a reference signal for measuring cross-link interference. In certain aspects, the signaling may further indicate that the resources are for a non-zero-power reference signal (NZP-RS). For example, the first UE 104a may be configured with certain uplink, downlink, and/or flexible resources, as described herein with respect to FIGS. 3A, 3C, and 11, and where the CLI resources overlap with certain resource types may indicate that the reference signal is zero-power or non-zero-power as further described herein. As used herein, a non-zero-power reference signal may refer to a reference signal (e.g., an SRS) that a wireless communication device will transmit, whereas a zero-power reference signal may refer to a reference signal that a wireless communication device will receive.

At 1004, the second UE 104b may receive, from the BS 102, signaling indicating the CLI configuration that provides resources for receiving the reference signal for measuring the cross-link interference. In certain aspects, the signaling may further indicate that the resources are for a zero-power reference signal (ZP-RS). The indication that the reference signal is zero-power or non-zero-power (at 1002 or 1004) may be received in radio resource control (RRC) signaling, downlink control information (DCI), or medium access control signaling, for example.

For certain aspects, the CLI configuration may be transmitted by the BS 102 in a common configuration message for the first and second UEs 104a, 104b. The CLI configuration may configure semi-persistent, periodic, or aperiodic resources for transmitting and/or measuring cross-link interference. The first and second UEs 104a, 104b may consider the resources in the CLI configuration as zero-power resources until further signaling is received at one of the UEs. For example, the signaling that activates semi-persistent resources (such as the MAC CE depicted in FIG. 8) may indicate that the first UE 104a is the transmitting UE. The signaling that triggers aperiodic resources (e.g., DCI) may indicate that the first UE 104a is the transmitting UE, and that the second UE 104b is the receiving UE.

At 1006, in response to determining that the configured resources are for measuring cross-link interference, the second UE 104b may monitor for the cross-link interference. For example, the second UE 104b may monitor for the cross-link interference according to a periodic or a semi-persistent schedule indicated in the CLI configuration.

At 1008, in response to determining that the configured resources are for transmitting a reference signal representative of cross-link interference, the first UE 104a may transmit a non-zero-power reference signal via the resources indicated in the CLI configuration. For example, the first UE 104a may transmit the reference according to the periodic or semi-persistent schedule indicated in the CLI configuration.

At 1010, the second UE 104b may measure certain properties associated with the cross-link interference and report indications of the measurements to the BS 102. For example, the measured signal properties may include, for example, a channel quality indicator, a signal-to-noise ratio (SNR), a signal-to-interference plus noise ratio (SINR), a signal-to-noise plus distortion ratio (SNDR), a received signal strength indicator (RSSI), a reference signal received power (RSRP), a reference signal received quality (RSRQ), and/or a block error rate (BLER).

In certain aspects, a UE may determine whether the cross-link interference resource as provided in the CLI configuration is a zero-power or non-zero-power resource based on the resource type (e.g., downlink, uplink, or flexible) configured in a slot format. For example, if a resource is configured as a downlink resource (or overlaps with a downlink resource) in a slot format, the UE may consider the cross-link interference resource to be a zero-power resource. If the resource is configured as an uplink resource (or overlaps with an uplink resource) in the slot format, the UE may consider the cross-link interference resource to be a non-zero-power resource.

Figure 11:
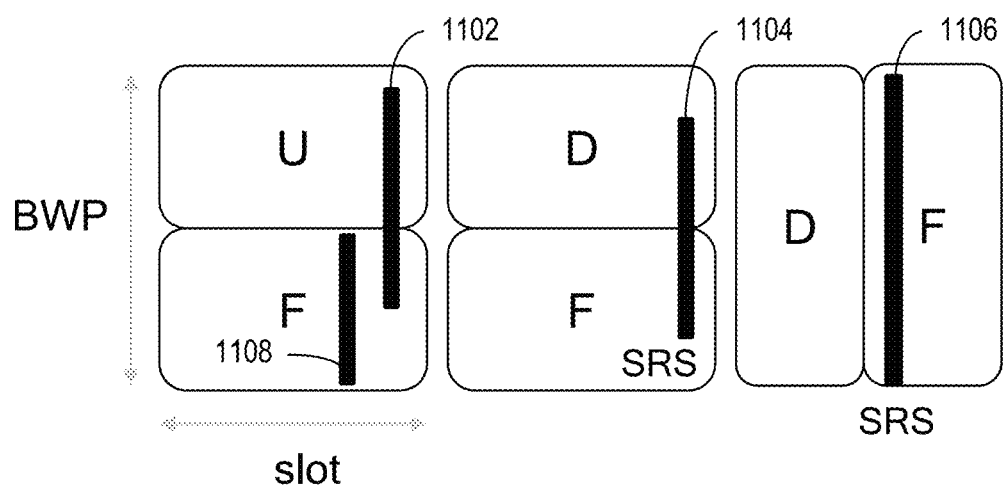
FIG. 11 illustrates various examples of reference signals arranged in slots (or symbols) designated for uplink, downlink, or flexible traffic.

If the resource is configured as a flexible resource (or overlaps with a flexible resource), the UE may use one of various options for interpreting the cross-link interference resource as a zero-power or non-zero-power resource. FIG. 11 illustrates various examples of reference signals arranged in slots (or symbols) designated for uplink, downlink, or flexible traffic. If the resource overlaps with an uplink resource and a flexible resource (e.g., reference signal 1102), the UE may consider the cross-link interference resource to be a non-zero-power resource. If the resource overlaps with a downlink resource and a flexible resources (e.g., reference signal 1104), the UE may consider the cross-link interference resource to be a zero-power resource. If the resource fully overlaps with a flexible resource (e.g., reference signal 1106, 1108), the UE may consider the cross-link interference resource to be a zero-power resource.

Figure 12:
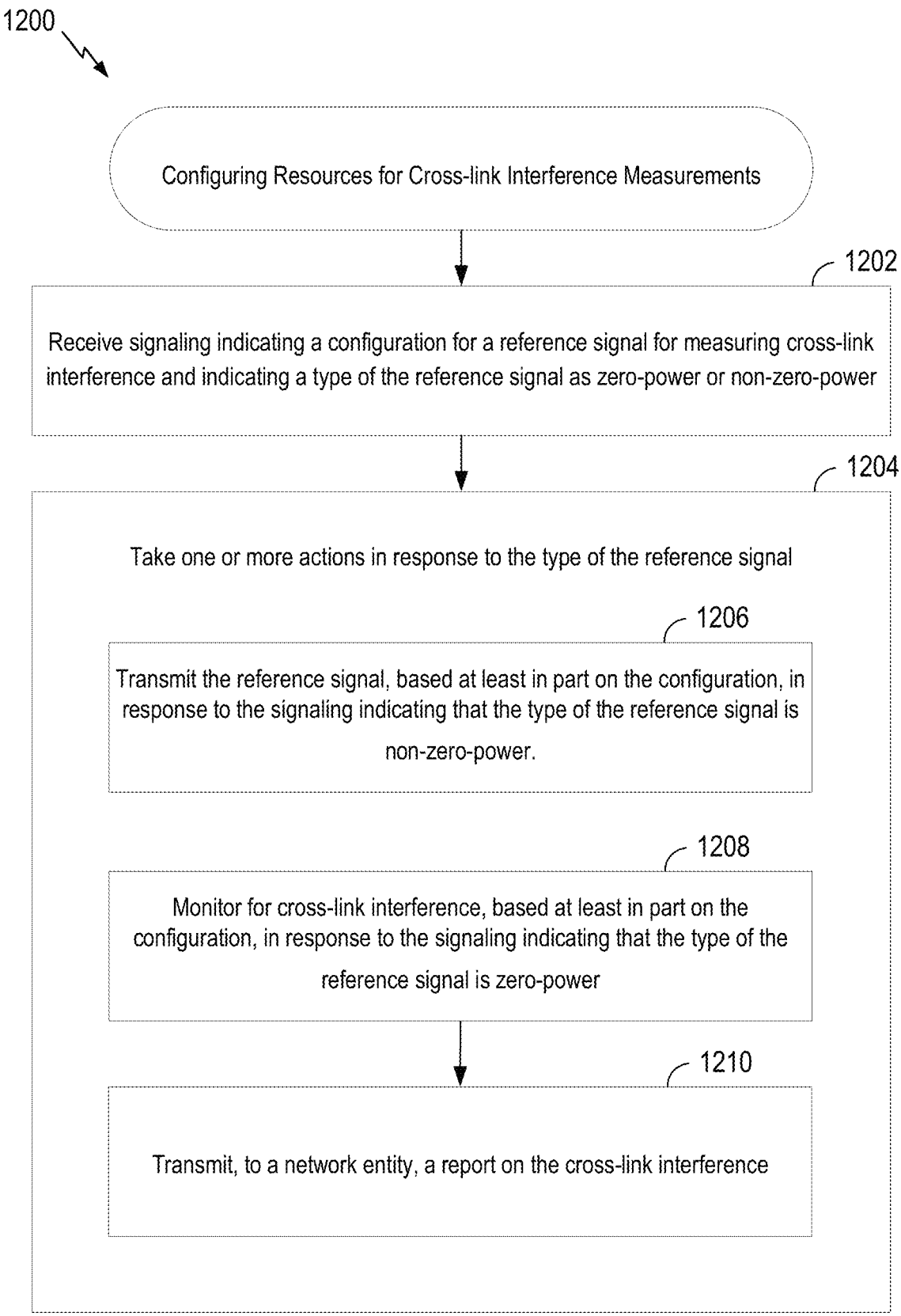
FIG. 12 is a flow diagram illustrating example operations for wireless communication, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (such as the UE 104 in the wireless communications system 100). The operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may optionally begin, at block 1202, where the UE may receive signaling indicating a configuration (e.g., a CSI report setting or configuration) for a reference signal for measuring cross-link interference and indicating a type of the reference signal as zero-power or non-zero-power. For example, the UE may receive, from a BS (e.g., the BS 102), RRC signaling indicating the configuration providing resources for transmitting a reference signal representative of cross-link interference or for monitoring for the cross-link interference as indicated by the type of reference signal. The type of reference signal may be indicated in the RRC signaling or additional signaling, such as MAC signaling or DCI. The CSI report configuration depicted in FIG. 9 may be representative of an example configuration received at block 1202. In certain cases, the configuration may be referred to as a CSI report setting. In certain aspects, the configuration received at block 1202 may include settings (e.g., information elements, fields, parameters, etc.) specific to a reference signal for measuring cross-link interference as further described herein.

At block 1204, the UE may take one or more actions in response to the type of the reference signal. In certain aspects, the signaling at block 1202 may indicate that the reference signal is a non-zero-power reference signal. For example, at block 1206, the UE may transmit the reference signal, based at least in part on the configuration, in response to the signaling indicating that the type of the reference signal is non-zero-power. The UE may transmit the reference signal in resources indicated in the configuration, for example.

In certain aspects, the signaling at block 1202 may indicate that the reference signal is a zero-power reference signal. For example, at block 1208, the UE may monitor for cross-link interference, based at least in part on the configuration, in response to the signaling indicating that the type of the reference signal is zero-power. For example, the UE may monitor for a reference signal (e.g., an SRS) transmitted by another UE in resources provided in the configuration. The UE may measure signal properties associated with the received reference signal. The signal properties may include the properties described herein with respect to FIG. 10, for example.

At block 1210, the UE may transmit, to a network entity (e.g., the BS 102), a report on the cross-link interference. For example, the report may indicate signal properties associated with the cross-link interference measured at block 1208. In certain cases, the UE may transmitting the report via Layer 1 (e.g., physical layer) or Layer 2 (e.g., MAC signaling) signaling, for example.

For certain aspects, the configuration may include CLI resources that are specific to one or more cells or to one or more UEs. The CLI resources may be configured at a cell level or a UE level. Cell level CLI resources may guarantee alignment (synchronization) between the transmitting and receiving UEs. Cell level CLI resources may also enable reduced control signaling overhead in configuring and activating the CLI resources. The CLI resources configured per UE may enable certain resources to be configured for separate and/or shared uses, such as CLI reporting, channel state information (e.g., precoding feedback), antenna switching, or other suitable uses. The CLI resources may have a merged or shared use, such as SRS-codebook-based feedback or SRS-antenna-switching being merged with an SRS-CLI. For example, the CLI-SRS may be configured as an SRS resource with usage value indicating that the SRS is at least for CLI measurements. The configuration may include an SRS configuration with an indication that the reference signal is used for at least measuring cross-link interference, such as a usage field that indicates one or more uses for the reference signal.

In certain aspects, the configuration may include a separate type of reference signal specific to cross-link interference measurements. The configuration may include an information element specific to cross-link interference. Such implementations (e.g., an SRS configuration or a CLI reference signal configuration) may leverage an information element in RRC signaling for configuring an SRS as the CLI reference signal and/or a separate CLI reference signal.

The configuration may include certain settings for the reference signal including a frequency domain resource mapping; a time domain resource mapping; a transmission comb value (e.g., comb-2 or comb-4); a comb offset; a resource type including aperiodic, semi-persistent, or periodic; a periodicity and offset for semi-persistent and periodic resources; a bandwidth in a bandwidth part; a frequency hopping pattern; or any combination thereof. In certain cases, the reference signal settings may use the same parameters or fields for configuring an SRS or a subset of such parameters or fields. Some fields for the SRS settings may not be used and new fields can be added to a CLI reference signal setting, for example.

The UE may determine the type of the reference signal through an implicit indication or an explicit indication in the signaling as further described herein. As an example, for a periodic or semi-persistent reference signal as indicated in the configuration, the UE may assume the reference signal is zero-power until further signaling (e.g., RRC signaling, MAC signaling, or DCI) is received. In certain cases, the interpretation of the type of reference signal (e.g., zero-power or non-zero-power) may depend on whether a cross-link interference report is indicated by, included in, or associated with the configuration.

For certain aspects, the interpretation of the type of reference signal (e.g., zero-power or non-zero-power) may depend on the timing behavior (e.g., periodic, semi-persistent, or aperiodic) of the reference signal indicated in the configuration. For example, for a periodic reference signal as indicated in the configuration or signaling, RRC signaling may indicate whether reference signal (or corresponding resources) is zero-power or non-zero-power. If the reference signal is periodic, the signaling indicating the type of the reference signal is received via radio resource control signaling. For a semi-persistent reference signal, the signaling (e.g., MAC signaling or DCI) that activates the semi-persistent resources may indicate whether reference signal (or corresponding resources) is zero-power or non-zero-power. If the reference signal is semi-persistent, the signaling indicating the type of the reference signal includes an activation of the semi-persistent reference signal via DCI or MAC signaling (e.g., the MAC CE or variant thereof depicted in FIG. 8). For example, the signaling may include a field that indicates which occasions (resources) are zero-power or non-zero-power. For an aperiodic reference signal, the signaling (e.g., DCI) that triggers (or schedules) the aperiodic resources may indicate whether reference signal (or corresponding resources) is zero-power or non-zero-power. If the reference signal is aperiodic, the signaling indicating the type of the reference signal includes a trigger of the aperiodic reference signal via DCI.

In certain aspects, RRC signaling may indicate whether reference signal (or corresponding resources) is zero-power or non-zero-power. For example, the signaling indicating the type of the reference signal may be received via RRC signaling.

For certain aspects, the interpretation of the type of reference signal (e.g., zero-power or non-zero-power) may depend on the CSI or CLI report configuration. For example, if the resources for the reference signal are associated explicitly/implicitly with a CSI or CLI report, the UE may interpret the reference signal (or corresponding resources) as zero-power. If the CSI/CLI report is not associated with the resources for the reference signal, the UE may interpret the reference signal (or corresponding resources) as non-zero-power. As an example, the signaling indicating the type of the reference signal may include a first indication that the type of the reference signal is zero-power if a cross-link interference report configuration is included with the signaling or associated with the resources for the reference signal; and a second indication that the type of the reference signal is non-zero-power if the cross-link interference report configuration is absent from the signaling or not associated with the resources for the reference signal.

In certain aspects, the slot format or type of resources (e.g., downlink, uplink, flexible) may indicate whether the reference signal (or corresponding resources) is zero-power or non-zero-power, for example, as described herein with respect to FIG. 11. The signaling indicating the type of the reference signal may be based at least in part on whether a resource for the reference signal is indicated as being or overlaps with an uplink resource, a downlink resource, or a flexible resource. The signaling indicating the type of the reference signal may include a first indication that the type of the reference signal is non-zero-power if the resource overlaps with the uplink resource; and a second indication that the type of the reference signal is zero-power if the resource overlaps with the downlink resource. The signaling indicating the type of the reference signal may be based at least in part on a full-duplex or a half-duplex capability of the UE if the resource overlaps with the flexible resource. The signaling indicating the type of the reference signal may be based at least in part on a slot type (or symbol type) if the resource overlaps with the flexible resource, where the slot or symbol type may include uplink, resource, or flexible.

The UE may be configured to report indications of the measurements or properties of the cross-link interference measured at block 1208, for example. The network may configure the receiving UE with a zero-power reference signal for cross-link measurements in a CSI report configuration, for example, as depicted in FIG. 9 and/or in a separate CLI report configuration. The signaling may further indicate a cross-link interference report configuration with a zero-power SRS resource (or a CLI specific reference signal) for cross-link interference measurement. The cross-link interference report configuration may include a CSI report configuration with a resource setting for the zero-power SRS resources and/or resources for reporting the CLI measurements. The resource setting may be part of or associated with a channel measurement resource (CMR) setting or an interference measurement resource (IMR) setting for the CSI report configuration.

The reporting of the cross-link interference may be based on a CLI report setting (e.g., the CSI report configuration depicted in FIG. 9) that explicitly or implicitly indicates one of the zero-power reference signal resources for CLI measurement. For example, a CLI report may be a special type of CSI report, where the CSI report configuration may include a separate resource setting for CLI measurements to indicate which zero-power resources set will be used for CLI measurements and/or which resources will be used for reporting the CLI measurements. The CSI report configuration may be linked to or identify zero-power resources for CLI measurements. In certain cases, the resource settings for CLI measurement/reporting may be part of or associated with CMR settings in the CSI report configuration, for example, as a resource set to report CLI RSRP or RSSI.

In certain cases, the CLI report configuration may be a separate report configuration from the CSI report configuration, where the CLI report configuration may identify or be linked to a CLI measurement resource setting that identifies the zero-power resources and/or resources for reporting the CLI measurements.

In certain cases, the resource settings for CLI measurement/reporting may be part of or associated with an IMR setting in a CSI report configuration. The CLI report may be a special type of CSI report (e.g., based on report quantity) which is associated with CSI-IM resources and/or zero-power CLI resources. The CSI report configuration for measuring CLI may be linked to at least one IMR setting (e.g., an IMR that includes a configuration of CSI-IM resource set(s)). There may be an association among the zero-power resources for CLI measurements, the CSI-IM resources, and the CSI report configuration. The CSI report configuration may indicate CSI-IM resources, which may be implicitly or explicitly associated with a zero-power reference signal for CLI measurements. For example, a separate configuration for the CLI reference signal resources may indicate that the CLI reference signal resources are associated with at least one of CSI-IM resources (or resource sets) as provided in a CSI report configuration. The CSI report configuration may not indicate the association between the CSI-IM resource and the CLI reference signal resources.

In certain aspects, the UE may be configured with (predefined) rules to determine the measurement/reporting resources for cross-link interference. For example, the UE may determine the measurement resources based on the CLI reference signal resources indicated in a CLI configuration and/or the CSI-IM resources indicated in a CSI report configuration, and the UE may determine the reporting resources based on an associated CSI-IM setting and/or CMR setting, for example, as provided in the CSI report setting. In certain aspects, the UE may be configured with separate reporting resources for CLI measurements. The reporting resources may include the uplink resources that the UE uses to transmit the CLI report to the network entity.

For semi-persistent CLI measurements, the UE may receive signaling that activates the semi-persistent resources. For example, the UE may receive MAC signaling (e.g., the MAC CE depicted in FIG. 8) that activates the semi-persistent resources as zero-power or non-zero-power. In certain cases, the RRC signaling may identify the CLI resources as zero-power or non-zero-power with different resource set identifiers, and the MAC signaling that activates the semi-persistent resources may indicate the zero-power or non-zero-power resource set with the corresponding identifier (e.g., the zero-power resource set identifier and the non-zero-power resource set identifier). The configuration at block 1202 may include a first resource identifier for the zero-power reference signal, and a second resource identifier for the non-zero-power reference signal, and the signaling include MAC signaling with a field indicating the type of the reference signal. For example, the MAC signaling may use the SP SRS Resource Set ID field for identifying the corresponding resource set for CLI measurements as shown in FIG. 8. In certain cases, the MAC signaling that activates the semi-persistent resources may include a separate field to indicate whether the resources are zero-power or non-zero-power.

In certain aspects, the reporting of CLI may use layer-1 (e.g., physical layer) or layer-2 (e.g., MAC layer) signaling. The MAC signaling that activates the semi-persistent zero-power resources may also activate the CLI reporting. A layer-1 CLI report based on a semi-persistent zero-power reference signal may be carried over a physical uplink control channel (PUCCH) if triggered by MAC signaling, for example. A layer-1 CLI report based on a semi-persistent zero-power reference signal may be carried over a physical uplink shared channel (PUSCH) if triggered by DCI. A layer-2 CLI report may be carried over an uplink MAC-CE. The network may configure the UE with triggering events for reporting the CLI via layer-2 signaling, for example, the triggering events may include the expiration of a timer, the measured CLI being greater than or equal to a threshold, etc.

Figure 13:
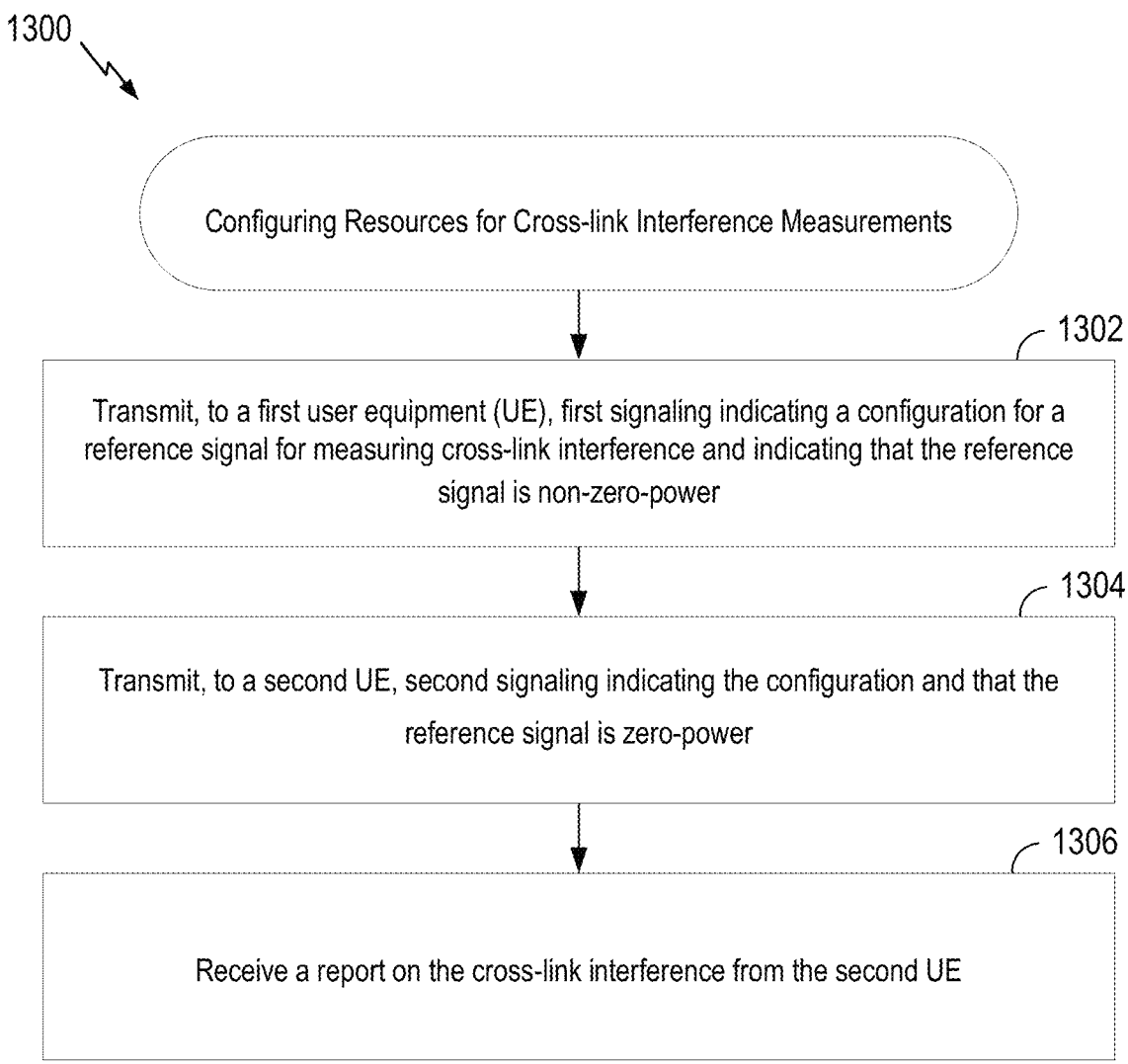
FIG. 13 is a flow diagram illustrating example operations for wireless communication, in accordance with certain aspects of the present disclosure.

FIG. 13 is a flow diagram illustrating example operations 1300 for wireless communication, in accordance with certain aspects of the present disclosure. The operations 1300 may be performed, for example, by a network entity (such as the BS 102 in the wireless communications system 100). The operations 1300 may be complementary to the operations 1200 performed by the UE. The operations 1300 may be implemented as software components that are executed and run on one or more processors (e.g., controller/processor 240 of FIG. 2). Further, the transmission and reception of signals by the network entity in operations 1300 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network, such as a base station, a remote radio head or antenna panel in communication with a base station, and/or a network controller, for example.

The operations 1300 may optionally begin, at block 1302, where the network entity may transmit, to a first user UE (e.g., the first UE 104a in FIG. 10), first signaling indicating a configuration for a reference signal for measuring cross-link interference and indicating that the reference signal is non-zero-power. At block 1304, the network entity may transmit, to a second UE (e.g., the second UE 104b in FIG. 10), second signaling indicating the configuration and that the reference signal is zero-power. At block 1306, the network entity may receive a report on the cross-link interference from the second UE. For example, the report may provide indications of the cross-link interference measured by the second UE.

The configuration described herein with respect to FIG. 12 may be representative of the configuration described with respected to FIG. 13. For example, the configuration may include resources for the reference signal specific to one or more cells or specific to one or more UEs. The configuration may include a SRS configuration with an indication that the reference signal is for measuring cross-link interference. The configuration may include an information element specific to cross-link interference. The configuration may include a frequency domain resource mapping; a time domain resource mapping; a transmission comb value; a comb offset; a resource type including aperiodic, semi-persistent, or periodic; a periodicity and offset for semi-persistent and periodic resources; a bandwidth in a bandwidth part; a frequency hopping pattern; or any combination thereof.

The first and second signaling may indicate whether the reference signal is zero-power or non-zero-power as described herein with respect to FIG. 12. For example, if the reference signal is periodic, the first and second signaling are transmitted via at least RRC signaling, which indicates the reference signal type. If the reference signal is semi-persistent, the first and second signaling include an activation of the semi-persistent reference signal via DCI or MAC signaling, which indicates the reference signal type. If the reference signal is aperiodic, the first and second signaling include a trigger of the aperiodic reference signal via DCI, which indicates the reference signal type.

RRC signaling may indicate whether reference signal (or corresponding resources) is zero-power or non-zero-power. For example, the first and second signaling may be transmitted via at least RRC signaling. In certain aspects, the network entity may transmit the first signaling and second signaling with the configuration in a common configuration message, such as RRC signaling.

For certain aspects, the indication of the type of reference signal (e.g., zero-power or non-zero-power) may depend on the CSI or CLI report configuration. For example, the first signaling may include a first indication that the reference signal is non-zero-power if a cross-link interference report configuration is absent from the first signaling or not associated with the resources for the reference signal. The second signaling may include a second indication that the reference signal is zero-power if the cross-link interference report configuration is included with the second signaling.

In certain aspects, the slot format or type of resources (e.g., downlink, uplink, flexible) may indicate whether the reference signal (or corresponding resources) is zero-power or non-zero-power, for example, as described herein with respect to FIGS. 11 and 12. The first and second signaling indicating the reference signal as zero-power or non-zero-power may be based at least in part on whether a resource for the reference signal is indicated as being or overlaps with an uplink resource, a downlink resource, or a flexible resource. The first signaling may include a first indication that the type of the reference signal is non-zero-power if the resource overlaps with the uplink resource, and the second signaling may include a second indication that the type of the reference signal is zero-power if the resource overlaps with the downlink resource. The first and second signaling indicating the reference signal as zero-power or non-zero-power may be based at least in part on a full-duplex or a half-duplex capability of a UE if the resource overlaps with the flexible resource. The first and second signaling indicating the reference signal as zero-power or non-zero-power may be based at least in part on a slot or symbol type if the resource overlaps with the flexible resource.

The network entity may configure the second UE to report indications of the measurements or properties of the cross-link interference measured, for example, as described herein with respect to FIG. 12. For example, the second signaling may further indicate a cross-link interference report configuration with a zero-power SRS resource (or a CLI specific reference signal) for cross-link interference measurement. The cross-link interference report configuration may include a CSI report configuration with a resource setting for the zero-power SRS resources and/or resources for reporting the CLI measurements. The resource setting may be part of or associated with CMR setting or an IMR setting for the CSI report configuration.

For semi-persistent CLI measurements, the network may transmit signaling to the first and second UEs that activates the semi-persistent resources, for example, as described herein with respect to FIG. 12. The configuration may include a first resource identifier for the zero-power reference signal, and a second resource identifier for the non-zero-power reference signal. The first and second signaling may include MAC signaling with a field indicating a type of the reference signal as zero-power or non-zero-power.

Example Wireless Communication Devices

Figure 14:
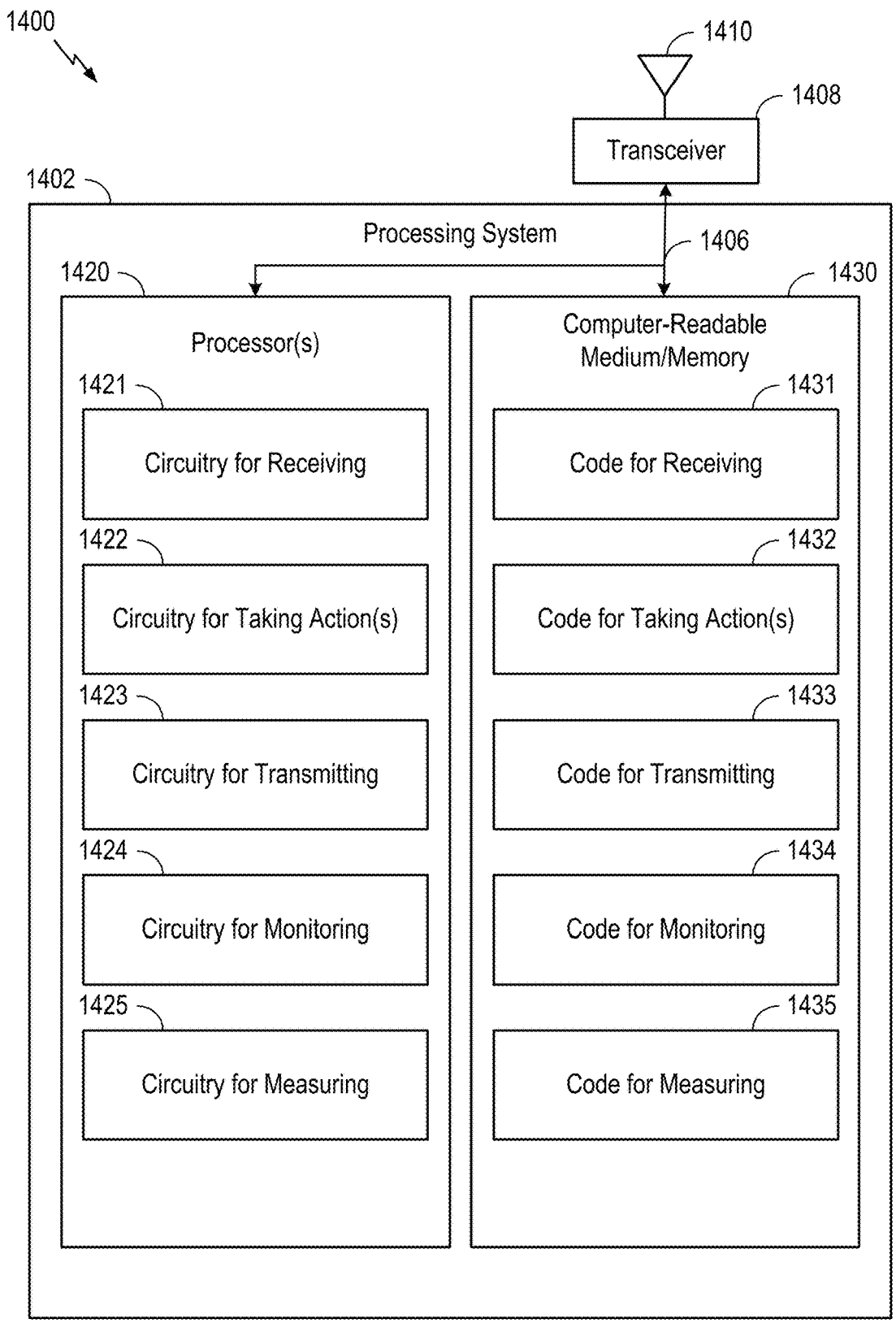
FIG. 14 depicts aspects of an example communications device.

FIG. 14 depicts an example communications device 1400 that includes various components operable, configured, or adapted to perform operations for the techniques disclosed herein, such as the operations depicted and described with respect to FIGS. 10-12. In some examples, communication device 1400 may be a user equipment 104 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIGS. 10-12, or other operations for performing the various techniques discussed herein for measuring and reporting cross-link interference.

In the depicted example, computer-readable medium/memory 1430 stores code 1431 for receiving, code 1432 for taking action(s), code 1433 for code for transmitting, code 1434 for code for monitoring, and/or code 1435 for code for measuring.

In the depicted example, the one or more processors 1420 include circuitry configured to implement the code stored in the computer-readable medium/memory 1430, including circuitry 1421 for receiving, circuitry 1422 for taking action(s), circuitry 1423 for transmitting, circuitry 1424 for monitoring, and/or circuitry 1425 for measuring.

Various components of communications device 1400 may provide means for performing the methods described herein, including with respect to FIGS. 10-12.

In some examples, means for transmitting or sending (or means for outputting for transmission) may include the transceivers 254 and/or antenna(s) 252 of the user equipment 104 illustrated in FIG. 2 and/or transceiver 1408 and antenna 1410 of the communication device 1400 in FIG. 14.

In some examples, means for receiving (or means for obtaining) may include the transceivers 254 and/or antenna(s) 252 of the user equipment 104 illustrated in FIG. 2 and/or transceiver 1408 and antenna 1410 of the communication device 1400 in FIG. 14.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for taking action(s), monitoring, and/or measuring may include various processing system components, such as: the one or more processors 1420 in FIG. 14, or aspects of the user equipment 104 depicted in FIG. 2, including receive processor 258, transmit processor 264, TX MIMO processor 266, and/or controller/processor 280 (including the interference measurement configuration component 281).

Notably, FIG. 14 is an example, and many other examples and configurations of communication device 1400 are possible.

Figure 15:
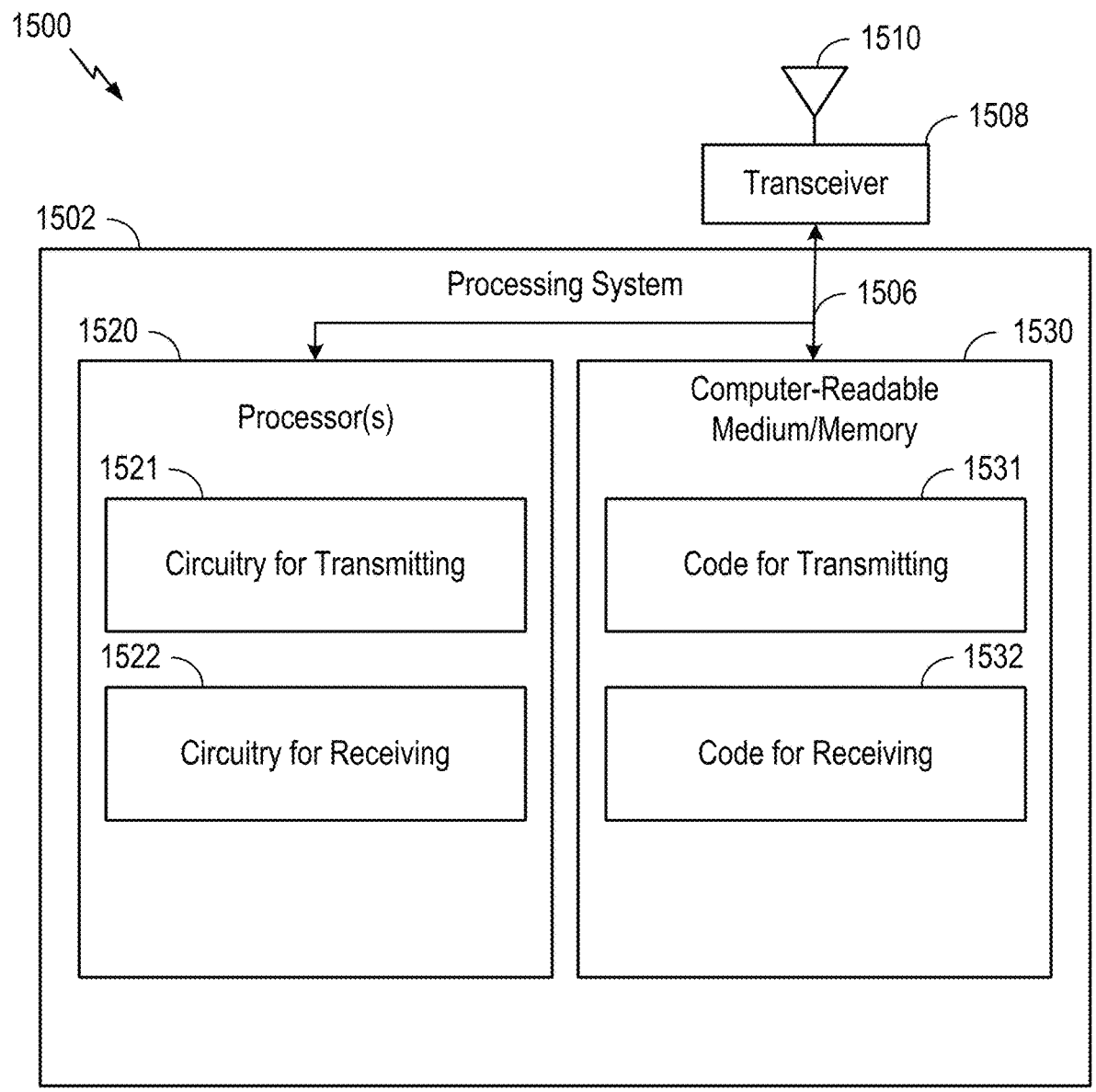
FIG. 15 depicts aspects of an example communications device.

FIG. 15 depicts an example communications device 1500 that includes various components operable, configured, or adapted to perform operations for the techniques disclosed herein, such as the operations depicted and described with respect to FIGS. 10, 11, and 13. In some examples, communication device 1500 may be a base station 102 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIGS. 10, 11, and 13, or other operations for performing the various techniques discussed herein for configuring resources for measuring and reporting cross-link interference.

In the depicted example, computer-readable medium/memory 1530 stores code 1531 for transmitting and/or code 1532 for receiving.

In the depicted example, the one or more processors 1520 include circuitry configured to implement the code stored in the computer-readable medium/memory 1530, including circuitry 1521 for transmitting and/or circuitry 1522 for receiving.

Various components of communications device 1500 may provide means for performing the methods described herein, including with respect to FIGS. 10, 11, and 13.

In some examples, means for transmitting or sending (or means for outputting for transmission) may include the transceivers 232 and/or antenna(s) 234 of the base station 102 illustrated in FIG. 2 and/or transceiver 1508 and antenna 1510 of the communication device 1500 in FIG. 15.

In some examples, means for receiving (or means for obtaining) may include the transceivers 232 and/or antenna(s) 234 of the base station illustrated in FIG. 2 and/or transceiver 1508 and antenna 1510 of the communication device 1500 in FIG. 15.

In some examples, means for transmitting and/or receiving may include various processing system components, such as: the one or more processors 1520 in FIG. 15, or aspects of the base station 102 depicted in FIG. 2, including receive processor 238, transmit processor 220, TX MIMO processor 230, and/or controller/processor 240 (including the interference measurement configuration component 241).

Notably, FIG. 15 is an example, and many other examples and configurations of communication device 1500 are possible.

Example Aspects

Implementation examples are described in the following numbered aspects:

Aspect 1: An apparatus for wireless communication, comprising: a memory; and a processor coupled to the memory, the processor and the memory being configured to: receive signaling indicating a configuration for a reference signal for measuring cross-link interference and indicating a type of the reference signal as zero-power or non-zero-power; and take one or more actions in response to the type of the reference signal.

Aspect 2: The apparatus of Aspect 1, wherein the processor and the memory are further configured to: transmit the reference signal, based at least in part on the configuration, in response to the signaling indicating that the type of the reference signal is non-zero-power.

Aspect 3: The apparatus according to any of Aspects 1 or 2, wherein the configuration includes resources for the reference signal specific to one or more cells or specific to one or more UEs.

Aspect 4: The apparatus according to any one of Aspects 1-3, wherein the configuration includes a sounding reference signal configuration with an indication that the reference signal is for measuring cross-link interference.

Aspect 5: The apparatus according to any one of Aspects 1-4, wherein the configuration includes an information element specific to cross-link interference.

Aspect 6: The apparatus according to any of Aspects 1 or 3-5, wherein the processor and the memory are further configured to: monitor for cross-link interference, based at least in part on the configuration, in response to the signaling indicating that the type of the reference signal is zero-power; and transmit, to a network entity, a report on the cross-link interference.

Aspect 7: The apparatus according to any of Aspects 1-6, wherein: if the reference signal is periodic, the signaling indicating the type of the reference signal is received via radio resource control signaling; if the reference signal is semi-persistent, the signaling indicating the type of the reference signal includes an activation of the semi-persistent reference signal via downlink control information or medium access control signaling; and if the reference signal is aperiodic, the signaling indicating the type of the reference signal includes a trigger of the aperiodic reference signal via downlink control information.

Aspect 8: The apparatus according to any of Aspects 1-7, wherein the signaling indicating the type of the reference signal is received via radio resource control signaling.

Aspect 9: The apparatus according to any of Aspects 1-8, wherein the signaling indicating the type of the reference signal includes: a first indication that the type of the reference signal is zero-power if a cross-link interference report configuration is included with the signaling; and a second indication that the type of the reference signal is non-zero-power if the cross-link interference report configuration is absent from the signaling.

Aspect 10: The apparatus according to any of Aspects 1-9, wherein the signaling indicating the type of the reference signal is based at least in part on whether a resource for the reference signal is indicated as being or overlaps with an uplink resource, a downlink resource, or a flexible resource.

Aspect 11: The apparatus according to any of Aspects 1-10, wherein: the signaling further indicates a cross-link interference report configuration with a zero-power sounding reference signal resource for cross-link interference measurement; the cross-link interference report configuration includes a channel state information report configuration with a resource setting for the zero-power sounding reference signal resource; and the resource setting is part of a channel measurement resource setting or an interference measurement setting for the channel state information report configuration.

Aspect 12: The apparatus according to any of Aspects 1-11, wherein the configuration includes a first resource identifier for the reference signal as zero-power, and a second resource identifier for the reference signal as non-zero-power.

Aspect 13: The apparatus according to any of Aspects 1-12, wherein the signaling includes medium access control signaling with a field indicating the type of the reference signal.

Aspect 14: An apparatus for wireless communication, comprising: a memory; and a processor coupled to the memory, the processor and the memory being configured to: transmit, to a first user equipment (UE), first signaling indicating a configuration for a reference signal for measuring cross-link interference and indicating that the reference signal is non-zero-power; transmit, to a second UE, second signaling indicating the configuration and that the reference signal is zero-power; and receive a report on the cross-link interference from the second UE.

Aspect 15: The apparatus of Aspect 14, wherein the configuration includes resources for the reference signal specific to one or more cells or specific to one or more UEs.

Aspect 16: The apparatus according to any of Aspects 14 or 15, wherein the configuration includes a sounding reference signal configuration with an indication that the reference signal is for measuring cross-link interference.

Aspect 17: The apparatus according to any of Aspects 14-16, wherein the configuration includes an information element specific to cross-link interference.

Aspect 18: The apparatus according to any of Aspects 14-17, wherein: if the reference signal is periodic, the first and second signaling are transmitted via radio resource control signaling; if the reference signal is semi-persistent, the first and second signaling include an activation of the semi-persistent reference signal via downlink control information or medium access control signaling; and if the reference signal is aperiodic, the first and second signaling include a trigger of the aperiodic reference signal via downlink control information.

Aspect 19: The apparatus according to any of Aspects 14-18, wherein the first and second signaling are transmitted via radio resource control signaling.

Aspect 20: The apparatus according to any of Aspects 14-19, wherein: the first signaling includes a first indication that the reference signal is non-zero-power if a cross-link interference report configuration is absent from the first signaling; and the second signaling includes a second indication that the reference signal is zero-power if the cross-link interference report configuration is included with the second signaling.

Aspect 21: The apparatus according to any of Aspects 14-20, wherein the first and second signaling indicating the reference signal as zero-power or non-zero-power is based at least in part on whether a resource for the reference signal is indicated as being or overlaps with an uplink resource, a downlink resource, or a flexible resource.

Aspect 22: The apparatus according to any of Aspects 14-21, wherein: the second signaling further indicates a cross-link interference report configuration with a zero-power sounding reference signal resource for cross-link interference measurement; the cross-link interference report configuration includes a channel state information report configuration with a resource setting for the zero-power sounding reference signal resource; and the resource setting is part of a channel measurement resource setting or an interference measurement setting for the channel state information report configuration.

Aspect 23: The apparatus according to any of Aspects 14-22, wherein the configuration includes a first resource identifier for the reference signal as zero-power, and a second resource identifier for the reference signal as non-zero-power.

Aspect 24: The apparatus according to any of Aspects 14-23, wherein the first and second signaling includes medium access control signaling with a field indicating a type of the reference signal as zero-power or non-zero-power.

Aspect 25: A method of wireless communication by a user equipment (UE), comprising: receiving signaling indicating a configuration for a reference signal for measuring cross-link interference and indicating a type of the reference signal as zero-power or non-zero-power; and taking one or more actions in response to the type of the reference signal.

Aspect 26: The method of Aspect 25, wherein taking one or more actions comprises: transmitting the reference signal, based at least in part on the configuration, in response to the signaling indicating that the type of the reference signal is non-zero-power.

Aspect 27: The method according to any of Aspects 25 or 26, wherein the configuration includes resources for the reference signal specific to one or more cells or specific to one or more UEs.

Aspect 28: The method according to any of Aspects 25-27, wherein the configuration includes a sounding reference signal configuration with an indication that the reference signal is for measuring cross-link interference.

Aspect 29: The method according to any one of Aspects 25-28, wherein the configuration includes an information element specific to cross-link interference.

Aspect 30: The method according to any one of Aspects 25-29, wherein the configuration includes at least one of: a time domain resource mapping; a transmission comb value; a comb offset; a resource type including aperiodic, semi-persistent, or periodic; a periodicity and offset for semi-persistent and periodic resources; a bandwidth in a bandwidth part; or a frequency hopping pattern.

Aspect 31: The method according to any one of Aspects 25 or 27-30, wherein taking one or more actions comprises:

monitoring for cross-link interference, based at least in part on the configuration, in response to the signaling indicating that the type of the reference signal is zero-power; and transmitting, to a network entity, a report on the cross-link interference.

Aspect 32: The method of Aspect 31, wherein transmitting the report comprises transmitting the report via Layer 1 or Layer 2 signaling.

Aspect 33: The method according to any of Aspects 25-32, wherein: if the reference signal is periodic, the signaling indicating the type of the reference signal is received via radio resource control signaling; if the reference signal is semi-persistent, the signaling indicating the type of the reference signal includes an activation of the semi-persistent reference signal via downlink control information or medium access control signaling; and if the reference signal is aperiodic, the signaling indicating the type of the reference signal includes a trigger of the aperiodic reference signal via downlink control information.

Aspect 34: The method according to any of Aspects 25-33, wherein the signaling indicating the type of the reference signal is received via radio resource control signaling.

Aspect 35: The method according to any of Aspects 25-34, wherein the signaling indicating the type of the reference signal includes: a first indication that the type of the reference signal is zero-power if a cross-link interference report configuration is included with the signaling; and a second indication that the type of the reference signal is non-zero-power if the cross-link interference report configuration is absent from the signaling.

Aspect 36: The method according to any of Aspects 25-35, wherein the signaling indicating the type of the reference signal is based at least in part on whether a resource for the reference signal is indicated as being or overlaps with an uplink resource, a downlink resource, or a flexible resource.

Aspect 37: The method of Aspect 36, wherein the signaling indicating the type of the reference signal includes: a first indication that the type of the reference signal is non-zero-power if the resource overlaps with the uplink resource; and a second indication that the type of the reference signal is zero-power if the resource overlaps with the downlink resource.

Aspect 38: The method according to any of Aspects 36 or 37, wherein the signaling indicating the type of the reference signal is based at least in part on a full-duplex or a half-duplex capability of the UE if the resource overlaps with the flexible resource.

Aspect 39: The method according to any of Aspects 36-38, wherein the signaling indicating the type of the reference signal is based at least in part on a slot type if the resource overlaps with the flexible resource.

Aspect 40: The method according to any of Aspects 25-39, wherein the signaling further indicates a cross-link interference report configuration with a zero-power sounding reference signal resource for cross-link interference measurement.

Aspect 41: The method of Aspect 40, wherein the cross-link interference report configuration includes a channel state information report configuration with a resource setting for the zero-power sounding reference signal resource.

Aspect 42: The method of Aspect 41, wherein the resource setting is part of a channel measurement resource setting or an interference measurement setting for the channel state information report configuration.

Aspect 43: The method according to any of Aspects 25-42, wherein the configuration includes a first resource identifier for the reference signal as zero-power, and a second resource identifier for the reference signal as non-zero-power.

Aspect 44: The method according to any of Aspects 25-43, wherein the signaling includes medium access control signaling with a field indicating the type of the reference signal.

Aspect 45: A method of wireless communication by a network entity, comprising: transmitting, to a first user equipment (UE), first signaling indicating a configuration for a reference signal for measuring cross-link interference and indicating that the reference signal is non-zero-power; transmitting, to a second UE, second signaling indicating the configuration and that the reference signal is zero-power; and receiving a report on the cross-link interference from the second UE.

Aspect 46: The method of Aspect 45, wherein the configuration includes resources for the reference signal specific to one or more cells or specific to one or more UEs.

Aspect 47: The method according to any of Aspects 45 or 46, wherein the configuration includes a sounding reference signal configuration with an indication that the reference signal is for measuring cross-link interference.

Aspect 48: The method according to any of Aspects 45-47, wherein the configuration includes an information element specific to cross-link interference.

Aspect 49: The method according to any of Aspects 45-48, wherein the configuration includes at least one of: a time domain resource mapping;

a transmission comb value; a comb offset; a resource type including aperiodic, semi-persistent, or periodic; a periodicity and offset for semi-persistent and periodic resources; a bandwidth in a bandwidth part; or a frequency hopping pattern.

Aspect 50: The method according to any of Aspects 45-49, wherein: if the reference signal is periodic, the first and second signaling are transmitted via radio resource control signaling; if the reference signal is semi-persistent, the first and second signaling include an activation of the semi-persistent reference signal via downlink control information or medium access control signaling; and if the reference signal is aperiodic, the first and second signaling include a trigger of the aperiodic reference signal via downlink control information.

Aspect 51: The method according to any of Aspects 45-50, wherein the first and second signaling are transmitted via radio resource control signaling.

Aspect 52: The method according to any of Aspects 45-51, wherein: the first signaling includes a first indication that the reference signal is non-zero-power if a cross-link interference report configuration is absent from the first signaling; and the second signaling includes a second indication that the reference signal is zero-power if the cross-link interference report configuration is included with the second signaling.

Aspect 53: The method according to any of Aspects 45-52, wherein the first and second signaling indicating the reference signal as zero-power or non-zero-power is based at least in part on whether a resource for the reference signal is indicated as being or overlaps with an uplink resource, a downlink resource, or a flexible resource.

Aspect 54: The method of Aspect 53, wherein: the first signaling includes a first indication that the type of the reference signal is non-zero-power if the resource overlaps with the uplink resource; and the second signaling includes a second indication that the type of the reference signal is zero-power if the resource overlaps with the downlink resource.

Aspect 55: The method according to any of Aspects 53 or 54, wherein the first and second signaling indicating the reference signal as zero-power or non-zero-power is based at least in part on a full-duplex or a half-duplex capability of a UE if the resource overlaps with the flexible resource.

Aspect 56: The method according to any of Aspects 53-55, wherein the first and second signaling indicating the reference signal as zero-power or non-zero-power is based at least in part on a slot type if the resource overlaps with the flexible resource.

Aspect 57: The method according to any of Aspects 45-56, wherein the second signaling further indicates a cross-link interference report configuration with a zero-power sounding reference signal resource for cross-link interference measurement.

Aspect 58: The method of Aspect 57, wherein the cross-link interference report configuration includes a channel state information report configuration with a resource setting for the zero-power sounding reference signal resource.

Aspect 59: The method of Aspect 58, wherein the resource setting is part of a channel measurement resource setting or an interference measurement setting for the channel state information report configuration.

Aspect 60: The method according to any of Aspects 45-59, wherein the configuration includes a first resource identifier for the reference signal as zero-power, and a second resource identifier for the reference signal as non-zero-power.

Aspect 61: The method according to any of Aspects 45-60, wherein the first and second signaling includes medium access control signaling with a field indicating a type of the reference signal as zero-power or non-zero-power.

Aspect 62: An apparatus, comprising: a memory comprising executable instructions; one or more processors configured to execute the executable instructions and cause the apparatus to perform a method in accordance with any one of Aspects 25-61.

Aspect 63: An apparatus, comprising means for performing a method in accordance with any one of Aspects 25-61.

Aspect 64: A non-transitory computer-readable medium comprising executable instructions that, when executed by one or more processors of an apparatus, cause the apparatus to perform a method in accordance with any one of Aspects 25-61.

Aspect 65: A computer program product embodied on a computer-readable storage medium comprising code for performing a method in accordance with any one of Aspects 25-61.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$)0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of configuring resources for measuring cross-link interference in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
   a memory; and
   one or more processors coupled to the memory, the one or more processors being configured to:
   receive, from a network entity, signaling indicating a configuration for a reference signal for measuring cross-link interference and indicating a type of the reference signal as zero-power or non-zero-power while the apparatus is operating in a full duplex communication mode, the apparatus being configured to perform simultaneous uplink and downlink communications while operating in the full duplex communication mode, wherein the type of the reference signal is indicated based on whether a cross-link interference report configuration is included with the signaling, and wherein the signaling includes an indication of a direction of the reference signal with the reference signal being the zero-power or the non-zero power signal; and
   take one or more actions in response to the type of the reference signal.

2. The apparatus of claim 1, wherein the one or more processors are further configured to:
   transmit the reference signal, based at least in part on the configuration, in response to the signaling indicating that the type of the reference signal is non-zero-power.

3. The apparatus of claim 1, wherein the configuration includes resources for the reference signal specific to one or more cells or specific to one or more UEs.

4. The apparatus of claim 1, wherein the configuration includes a sounding reference signal configuration with an indication that the reference signal is for measuring cross-link interference.

5. The apparatus of claim 1, wherein the configuration includes an information element specific to cross-link interference.

6. The apparatus of claim 1, wherein the one or more processors are further configured to:
monitor for cross-link interference, based at least in part on the configuration, in response to the signaling indicating that the type of the reference signal is zero-power; and
transmit, to the network entity, a report on the cross-link interference.

7. The apparatus of claim 1, wherein:
if the reference signal is periodic, the signaling indicating the type of the reference signal is received via radio resource control signaling;
if the reference signal is semi-persistent, the signaling indicating the type of the reference signal includes an activation of the semi-persistent reference signal via downlink control information or medium access control signaling; and
if the reference signal is aperiodic, the signaling indicating the type of the reference signal includes a trigger of the aperiodic reference signal via downlink control information.

8. The apparatus of claim 1, wherein the signaling indicating the type of the reference signal is received via radio resource control signaling.

9. The apparatus of claim 1, wherein the signaling indicating the type of the reference signal includes:
a first indication that the type of the reference signal is zero-power if the cross-link interference report configuration is included with the signaling; and
a second indication that the type of the reference signal is non-zero-power if the cross-link interference report configuration is absent from the signaling.

10. The apparatus of claim 1, wherein the signaling indicating the type of the reference signal is based at least in part on whether a resource for the reference signal is indicated as being or overlaps with an uplink resource, a downlink resource, or a flexible resource.

11. The apparatus of claim 1, wherein:
the signaling further indicates the cross-link interference report configuration with a zero-power sounding reference signal resource for cross-link interference measurement;
the cross-link interference report configuration includes a channel state information report configuration with a resource setting for the zero-power sounding reference signal resource; and
the resource setting is part of a channel measurement resource setting or an interference measurement setting for the channel state information report configuration.

12. The apparatus of claim 1, wherein the configuration includes a first resource identifier for the reference signal as zero-power, and a second resource identifier for the reference signal as non-zero-power.

13. The apparatus of claim 1, wherein the signaling includes medium access control signaling with a field indicating the type of the reference signal.

14. An apparatus for wireless communication, comprising:
a memory; and
one or more processors coupled to the memory, the one or more processors being configured to:
transmit, to a first user equipment (UE), first signaling indicating a configuration for a reference signal for measuring cross-link interference and indicating that the reference signal is non-zero-power while the first UE is operating in a full duplex communication mode, the first UE being configured to perform simultaneous uplink and downlink communications while operating in the full duplex communication mode, wherein the first signaling includes a first indication that the reference signal is non-zero-power based on a cross-link interference report configuration being absent from the first signaling;
transmit, to a second UE, second signaling indicating the configuration and that the reference signal is zero-power while the first UE is operating in the full duplex communication mode, wherein the first signaling includes an indication of a direction of the reference signal with the reference signal being the zero-power or the non-zero power signal; and
receive a report on the cross-link interference from the second UE.

15. The apparatus of claim 14, wherein the configuration includes resources for the reference signal specific to one or more cells or specific to one or more UEs.

16. The apparatus of claim 14, wherein the configuration includes a sounding reference signal configuration with an indication that the reference signal is for measuring cross-link interference.

17. The apparatus of claim 14, wherein the configuration includes an information element specific to cross-link interference.

18. The apparatus of claim 14, wherein:
if the reference signal is periodic, the first and second signaling are transmitted via radio resource control signaling;
if the reference signal is semi-persistent, the first and second signaling include an activation of the semi-persistent reference signal via downlink control information or medium access control signaling; and
if the reference signal is aperiodic, the first and second signaling include a trigger of the aperiodic reference signal via downlink control information.

19. The apparatus of claim 14, wherein the first and second signaling are transmitted via radio resource control signaling.

20. The apparatus of claim 14, wherein:
the second signaling includes a second indication that the reference signal is zero-power based on the cross-link interference report configuration being included with the second signaling.

21. The apparatus of claim 14, wherein the first and second signaling indicating the reference signal as zero-power or non-zero-power is based at least in part on whether a resource for the reference signal is indicated as being or overlaps with an uplink resource, a downlink resource, or a flexible resource.

22. The apparatus of claim 14, wherein:
the second signaling further indicates a cross-link interference report configuration with a zero-power sounding reference signal resource for cross-link interference measurement;

the cross-link interference report configuration includes a channel state information report configuration with a resource setting for the zero-power sounding reference signal resource; and the resource setting is part of a channel measurement resource setting or an interference measurement setting for the channel state information report configuration.

23. The apparatus of claim 14, wherein the configuration includes a first resource identifier for the reference signal as zero-power, and a second resource identifier for the reference signal as non-zero-power.

24. The apparatus of claim 14, wherein the first and second signaling includes medium access control signaling with a field indicating a type of the reference signal as zero-power or non-zero-power.

25. A method of wireless communication by a user equipment (UE), comprising:

receive signaling, from a network entity, indicating a configuration for a reference signal for measuring cross-link interference and indicating a type of the reference signal as zero-power or non-zero-power while the UE is operating in a full duplex communication mode, the UE being configured to perform simultaneous uplink and downlink communications while operating in the full duplex communication mode, wherein the type of the reference signal is indicated based on whether a cross-link interference report configuration is included with the signaling, and wherein the signaling includes an indication of a direction of the reference signal with the reference signal being a zero-power or a non-zero power signal; and take one or more actions in response to the type of the reference signal.

26. The method of claim 25, wherein taking one or more actions comprises:

transmitting the reference signal, based at least in part on the configuration, in response to the signaling indicating that the type of the reference signal is non-zero-power.

27. The method of claim 25, wherein taking one or more actions comprises:

monitoring for cross-link interference, based at least in part on the configuration, in response to the signaling indicating that the type of the reference signal is zero-power; and transmitting, to the network entity, a report on the cross-link interference.

28. The method of claim 25, wherein:

if the reference signal is periodic, the signaling indicating the type of the reference signal is received via radio resource control signaling;

if the reference signal is semi-persistent, the signaling indicating the type of the reference signal includes an activation of the semi-persistent reference signal via downlink control information or medium access control signaling; and if the reference signal is aperiodic, the signaling indicating the type of the reference signal includes a trigger of the aperiodic reference signal via downlink control information.

29. A method of wireless communication by a network entity, comprising:

transmitting, to a first user equipment (UE), first signaling indicating a configuration for a reference signal for measuring cross-link interference and indicating that the reference signal is non-zero-power while the first UE is operating in a full duplex communication mode, the first UE being configured to perform simultaneous uplink and downlink communications while operating in the full duplex communication mode, wherein the first signaling includes a first indication that the reference signal is non-zero-power based on a cross-link interference report configuration being absent from the first signaling;

transmitting, to a second UE, second signaling indicating the configuration and that the reference signal is zero-power while the first UE is operating in the full duplex communication mode, wherein the first signaling includes an indication of a direction of the reference signal with the reference signal being the zero-power or the non-zero power signal; and receiving a report on the cross-link interference from the second UE.

30. The method of claim 29, wherein:

if the reference signal is periodic, the first and second signaling are transmitted via radio resource control signaling;

if the reference signal is semi-persistent, the first and second signaling include an activation of the semi-persistent reference signal via downlink control information or medium access control signaling; and if the reference signal is aperiodic, the first and second signaling include a trigger of the aperiodic reference signal via downlink control information.

\* \* \* \* \*